United States Patent
So et al.

(10) Patent No.: US 7,012,919 B1
(45) Date of Patent: Mar. 14, 2006

(54) MICRO-FLOW LABEL SWITCHING

(75) Inventors: Tricci Y. So, San Carlos, CA (US); Lawrence G. Roberts, Woodside, CA (US); Faizel Z. Lakhani, Campbell, CA (US); John A. McBrayne, Mountain View, CA (US); Gary G. Croke, Palo Alto, CA (US)

(73) Assignee: Caspian Networks, Inc., San Jose, CA (US)

( * ) Notice: Subject to any disclaimer, the term of this patent is extended or adjusted under 35 U.S.C. 154(b) by 1069 days.

(21) Appl. No.: 09/733,783

(22) Filed: Dec. 8, 2000

Related U.S. Application Data

(63) Continuation-in-part of application No. 09/552,278, filed on Apr. 19, 2000, now Pat. No. 6,574,195.

(51) Int. Cl.
*H04L 12/56* (2006.01)

(52) U.S. Cl. ..................... 370/392; 370/235

(58) Field of Classification Search ............... 370/401, 370/229, 230, 231, 232, 233, 234, 235, 237, 370/411, 412–418, 465, 351, 352, 444, 503, 370/395.1, 395.52, 395.61, 395.4, 395.41, 370/395.21, 395.2, 395.42, 395.32, 384
See application file for complete search history.

(56) References Cited

U.S. PATENT DOCUMENTS

| | | | |
|---|---|---|---|
| 6,408,005 B1 * | 6/2002 | Fan et al. | 370/412 |
| 6,473,404 B1 * | 10/2002 | Kaplan et al. | 370/238 |
| 6,574,195 B1 * | 6/2003 | Roberts | 370/235 |
| 6,678,264 B1 * | 1/2004 | Gibson | 370/352 |

* cited by examiner

*Primary Examiner*—Dang Ton
(74) *Attorney, Agent, or Firm*—Martine Penilla & Gencarella, LLP

(57) ABSTRACT

An invention is provided for affording an aggregate micro-flow having intelligent load balancing. Initially, a set of label switched paths (LSPs) is defined for a network domain. Then, as the network receives a set of data packets, a micro-flow comprising the set of data packets is defined. In addition to the information included in each received data packet, the micro-flow includes a quality of service (QoS) type. A particular label switched path (LSP) is selected from the defined set of LSPs, based on the QoS type of the micro-flow, and the micro-flow is transmitted along the selected LSP.

29 Claims, 15 Drawing Sheets

MICRO-FLOW LABEL SWITCHING

CROSS REFERENCE TO RELATED APPLICATIONS

This application is a continuation-in-part (CIP) of U.S. patent application Ser. No. 09/552,278, filed on Apr. 19, 2000, now U.S. Pat. No. 6,574,195 entitled "MICRO-FLOW MANAGEMENT," which is hereby incorporated by reference in its entirety.

This application also is related to U.S. patent application Ser. No. 09/699,199, filed Oct. 27, 2000, now abandoned and entitled "SYSTEM AND METHOD FOR UTILIZATION BASED MICRO-FLOW LABEL SWITCHING," which is hereby incorporated by reference in its entirety.

BACKGROUND OF THE INVENTION

1. Field of the Invention

This invention relates generally to computer networking, and more particularly to micro-flow based label switched path utilization over a computer network.

2. Description of the Related Art

Due to high customer demand for increasingly reliable and differentiated services, today's Internet Service Providers (ISPs) are constantly faced with the challenge of adapting their networks to support increased customer demand and growth. As a result, many ISPs rely upon conventional switches and network servers to connect dial-in port concentrators to backbone networks, such as the Internet. In the past, these servers and port concentrators typically communicated with each other through the use of an Internet Protocol (IP), while the port concentrators typically communicated with the network backbone through asynchronous transfer mode (ATM) protocol.

The previously described configuration is often referred to as an IP over ATM model. IP over ATM uses an overlay model in which a logical IP routed topology runs over and is independent of an underlying Open Systems Interconnection (OSI) Layer 2 switched ATM topology. The OSI Reference Model is the International Organization for Standard's (ISO) layered communication protocol model.

The Layer 2 switches provide high-speed connectivity, while the IP routers at the edge, interconnected by a mesh of Layer 2 virtual circuits, provide the intelligence to forward IP datagrams.

Although, the ATM switches provided high bandwidth, the requirement of costly network interface cards, 10% "cell tax" overhead, numerous system interrupts, and poor routing stability reduce its effectiveness. Moreover, the growth of Internet services and Wavelength Division Multiplexing (WDM) technology at the fiber level has provided a viable alternative to ATM for multiplexing multiple services over individual circuits. Moreover, ATM switches currently are being out-performed by Internet backbone routers, and multilayer switching paradigms, such as Mulitprotocol Label Switching (MPLS) offer simpler mechanisms for packet-oriented traffic engineering (TE) and multiservice functionality. Hence, many ISPs currently utilize MPLS technology to provide label path switching as the method to interconnect multiple transit devices instead of ATM technology.

The basic function of MPLS is to provide a Layer 2 Label Switched Path (LSP), which is similar to ATM, to transport one or more traffic flows over a predetermined path. The path is generally traffic engineered (TE) to maximize the usage of the physical links within the network that were under-utilized using the existing routing algorithm. Once an LSP is established, the LSP becomes a logical link and is integrated into the Layer 3 routing topology. When a packet is transported over the LSP, a Layer 2 switching function is performed for fast packet forwarding.

A conventional MPLS protocol includes a signaling component and a forwarding component. The signaling component is used to establish LSPs based on either traffic engineered information or dynamic routing information. Once a LSP is established, the associated incoming and outgoing labels at each label switched router (LSR) form a forwarding entry in a MPLS forwarding table, which is used by the forwarding component to perform fast packet forwarding on the labeled MPLS packets.

When packets arrive, the forwarding component searches the forwarding table to make a routing decision for each packet. Specifically, the forwarding component examines the incoming MPLS label and searches for a match. If there is a match, the packet is directed to the appropriate outgoing interface across the system's switching fabric.

The header of each packet is generally given a label, which is a short, fixed length value that identifies a Forwarding Equivalence Class (FEC) for the packet. Each FEC is a set of packets that are forwarded over the same path through a network, even if the individual packets' ultimate destinations are different. Label switches use the FEC to determine which LSP to utilize for transmitting the packet. It should be noted that a plurality of FECs may be mapped to the same LSP, and likewise, more than one LSP may be mapped to each FEC. The packet is then transmitted using the selected LSP, which defines an ingress-to-egress path through the network that is followed by all packets assigned to a specific FEC.

In the core of the network, label switches ignore the packet's network layer header and simply forward the packet using the packet's label. Basically, when a labeled packet arrives at a label switch, the forwarding component uses the input port number and label to perform an exact match search of its forwarding table. When a match is found, the forwarding component retrieves the next hop address from the forwarding table and directs the packet to the outbound interface for transmission to the next hop in the LSP.

This allows for the OSI interconnection Layer to by-pass having to look in the individual Layer 3 destinations and to simply route based upon the MPLS labels. Moreover, a MPLS topology allows for a network control application to monitor the LSPs that are established in the network and, allows the application to create new LSPs as the traffic between routers changes, either in direction or in size.

However, traffic from users is not always predictable, and hence excess capacity must be provided in each LSP to ensure available bandwidth during rerouting. High levels of flow aggregation require a higher amount of excessive bandwidth to be provisioned on each LSP to support transient "burstiness" of the traffic load, which is an extremely inefficient use of network resources. Moreover, routing with aggregated flows through the network causes significant strain and shift as the network re-aligns during failure, as shown next with reference to FIGS. 1A and 1B.

FIG. 1A is an illustration showing a conventional LSP based network 100. The conventional LSP based network 100 includes label switches 102, 104, and 106, a first LSP 108 connecting label switch 102 to label switch 106, and a second LSP 110a connecting label switch 102 to label switch 104. Finally, each LSP includes a large aggregate flow 112a and 112b, comprised of a plurality of individual data flows.

Each individual flow is a group of IP data packets from a single data transmission, wherein each IP data packet in the flow includes the same source address, destination address, source port, destination port, and IP protocol type. In addition, each packet of the flow follows the preceding packet by no more than a predetermined amount of time, for example, 2 milliseconds (ms).

During normal operation the conventional LSP based network 100 functions satisfactorily. Specifically, the individual flows included in the aggregate flows 112a and 112b of each LSP 108 and 110a reach their respective destinations in a satisfactory manner. However, when unexpected rerouting occurs, problems arise, as shown next with reference to FIG. 1B.

FIG. 1B is an illustration of a conventional LSP based network 100 having an unusable LSP. In the FIG. 1B, the second LSP 110a connecting label switch 102 to label switch 104 is no longer usable, for example, because of congestion or physical wire failure. In this case, the aggregate flow 112b included in the second LSP 110a must be rerouted along a third LSP 110b, which connects label switch 102 to label switch 104 via label switch 106. However, as shown in FIG. 1B, the third LSP 110b and the first LSP 108 share a common path, specifically, the connection between label switch 102 and label switch 106. Hence, the first LSP 108 must include enough bandwidth to accommodate the entire bandwidth of the second LSP 110a, which was rerouted to the third LSP 110b.

FIG. 1B illustrates the difficulty of rerouting large aggregate flows. To ensure available bandwidth for rerouting, LSP 108 must always reserve enough bandwidth to accommodate adjacent LSPs in the event of a reroute, such as rerouted LSP 110b shown in FIG. 1B. Since such a large bandwidth reserve, or threshold, is needed to accommodate unexpected flow increases, link utilization is low. For example, if 50% of a link's bandwidth is utilized by its aggregate flow, the other 50% may have to be reserved in case of an unexpected flow reroute. Hence, 50% of the link bandwidth is not utilized during general operation.

Moreover, fault recovery in a conventional LSP based network is slow, typically 20 seconds to 2 minutes. This slow fault recovery time results from a lack of control over the individual flows within each LSP. As stated previously, a conventional LSP based network routes each individual flow to a particular LSP based on the FEC associated with each individual flow. However, once an individual flow is routed to a particular LSP, the network can no longer efficiently alter the path of the individual flow. As a result, if a particular switch or area of an LSP is disabled, local repair can occur, however such new path will not be the most efficient at transporting the micro-flows. In addition, when a fault at a particular switch occurs, the failure indication is not communicated to the source node in real time. Hence, end-to-end recovery is delayed, typically resulting in network congestion.

In view of the forgoing, there is a need for an intelligent traffic engineering protocol that provides load balancing based on the utilization of individual LSPs. In addition, the protocol should integrate OSI based Layer 2 and OSI based Layer 3 switching, provide good traceability of data flows, and allow for fast fault recovery.

SUMMARY OF THE INVENTION

Broadly speaking, the present invention fills these needs by providing an intelligent traffic engineering protocol that manages micro-flows within dynamically selected LSPs. In one embodiment, a method for providing an aggregate micro-flow having intelligent load balancing is disclosed. Initially, a set of label switched paths (LSPs) is defined for a network domain. Then, as the network receives a set of data packets, a micro-flow comprising the set of data packets is defined. In addition to the information included in each received data packet, the micro-flow includes a quality of service (QoS) type. A particular label switched path (LSP) is selected from the defined set of LSPs, based on the QoS type of the micro-flow, and the micro-flow is transmitted along the selected LSP.

In another embodiment, a micro-flow wrapper logical unit is described. The micro-flow logical unit includes a predefined LSP, which defines a physical path along a set of network switches for transmission of a network data packet. In addition, the LSP is preferably capable of supporting a first QoS type for data packets transmitted along the LSP. Also included in the micro-flow wrapper logical unit is a micro-flow, which comprises a plurality of data packets transmitted along the predefined LSP, and includes a second QoS type. To ensure good QoS, the first QoS type preferably is not a lower QoS type than the second QoS type. Generally, QoS types having less stringent requirements for delay, jitter, and loss are considered lower QoS types than those having more strict requirements for delay, jitter, and loss. Thus, the QoS type capable of being supported by the defined LSP preferably is greater than, or equal to, the QoS type of the micro-flow.

A network switch for routing a micro-flow is disclosed in yet a further embodiment of the present invention. The network switch includes a database having a predefined set of LSPs, and an internal routing fabric capable of internally routing a micro-flow. As discussed previously, the micro-flow comprises a set of data packets, and also has a QoS type associated with it. The network switch further includes logic that selects a particular LSP from the defined set of LSPs included in the database. The logic selects the particular LSP based on the QoS type of the micro-flow. Finally, the network switch includes an egress line card that is capable of transmitting the micro-flow along the selected LSP.

In yet a further embodiment, a method for providing an aggregate micro-flow using LSP utilization information is disclosed. A set of label switched paths and a micro-flow comprising a set of data packets are defined. Next, a particular label switched path is selected from the set of label switched paths based on a utilization value of the particular label switched path. The micro-flow then is transmitted along the selected label switched path.

Advantageously, embodiments of the present invention use predetermined LSPs to route micro-flows. Because many network providers currently use LSP based networks, a protocol that shares common characteristics with LSP based networks integrates easier with existing equipment. In addition, embodiments of the present invention provide intelligent load balancing using individual micro-flows to better manage the network automatically. Further, micro-flow traceability is enhanced because of the use of LSPs.

Moreover, because of load balancing, congestion risk is reduced in the embodiments of the present invention. In addition, embodiments of the present invention afford the ability to manage data flow at the micro-flow level. This low level management allows enhanced fault recovery since the micro-flows can be rerouted from the point of failure, rather than at the beginning of the network domain as is the case with conventional LSP based networks.

Finally, it will become apparent to those skilled in the art that the ability to manage individual micro-flows allows the use of reduced LSP thresholds, resulting in increased resource utilization. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which:

FIGS. 4C-2 shows an exemplary segment of a micro-flow LSP network domain performing a local repair, in accordance with an embodiment of the present invention;

FIGS. 4C-3 is an illustration showing the exemplary segment of a micro-flow LSP network domain performing a source reroute, in accordance with an embodiment of the present invention;

DETAILED DESCRIPTION OF THE EMBODIMENTS OF THE PRESENT INVENTION

The present invention provides enhanced dynamic network resource traffic engineering in an LSP-based network environment. In particular, the present invention provides increased link utilization, enhanced load balancing, and efficient fault recovery, by providing intelligent link management at the micro-flow level within an LSP-based environment. In the following description, numerous specific details are set forth in the description of various embodiments of the present invention in order to provide a thorough understanding of the present invention. It will be apparent, however, to one skilled in the art that the present invention may be practiced without some or all of these specific details.

In accordance with one embodiment of the present invention, the aforementioned problems of low link utilization, poor load balancing, and slow fault recovery are addressed by the use of an intelligent and dynamic network resource traffic engineering mechanism. The intelligent and dynamic network resource traffic engineering mechanism, as described throughout this specification, includes a method of forwarding micro-flows to selected label switched paths (LSPs) based on quality of service descriptors, additional FEC requirements, and current link or path utilization characteristics.

In the following description, the term switch will be used as synonymous with router. In particular, it should noted that the reference to a switch is intended to merely refer to any type of device that assists in the transporting of data signals from one point in a network to another point in the network.

Further, the term quality of service (QoS) will be used to refer to any service definition related information that can be associated with a data packet, micro-flow, or Label Switched Path. For example, QoS can refer to transmission rate information, delay variation information, and jitter information. In addition, QoS can refer to the ability to define a level of performance in a data communications system. For example, networks often specify modes of service that ensure optimum performance for traffic such as real-time voice and video. It should be born in mind that QoS has become a major issue on the Internet as well as in enterprise networks, because voice and video are increasingly traveling over IP-based data networks.

By way of background, when data is sent from a host computer to a target computer via a computer network, the data is divided into individual data packets that are individually routed through the network. When eventually received by the target computer, the data packets are collated back into the original form of the data.

Figure 1A:
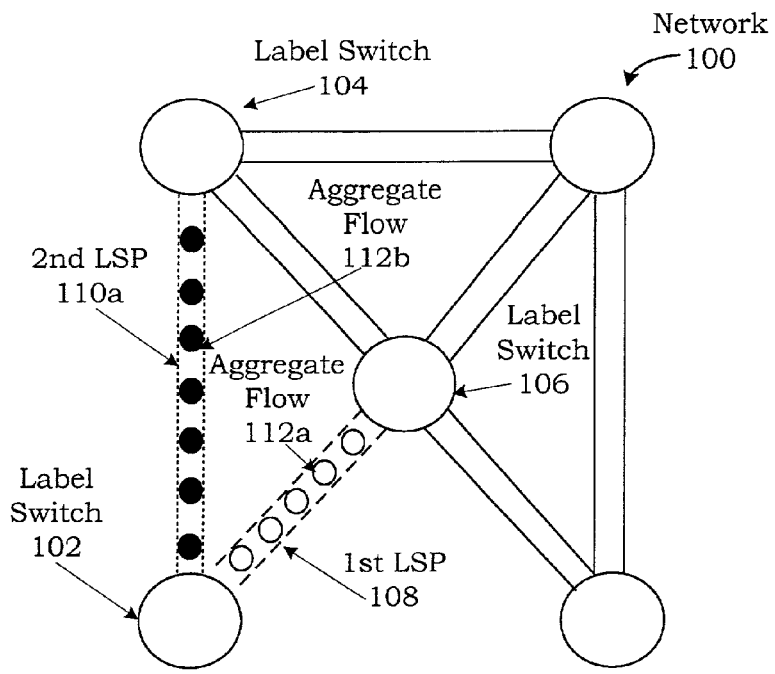
FIG. 1A is an illustration showing a segment of a conventional LSP based network.
Figure 1B:
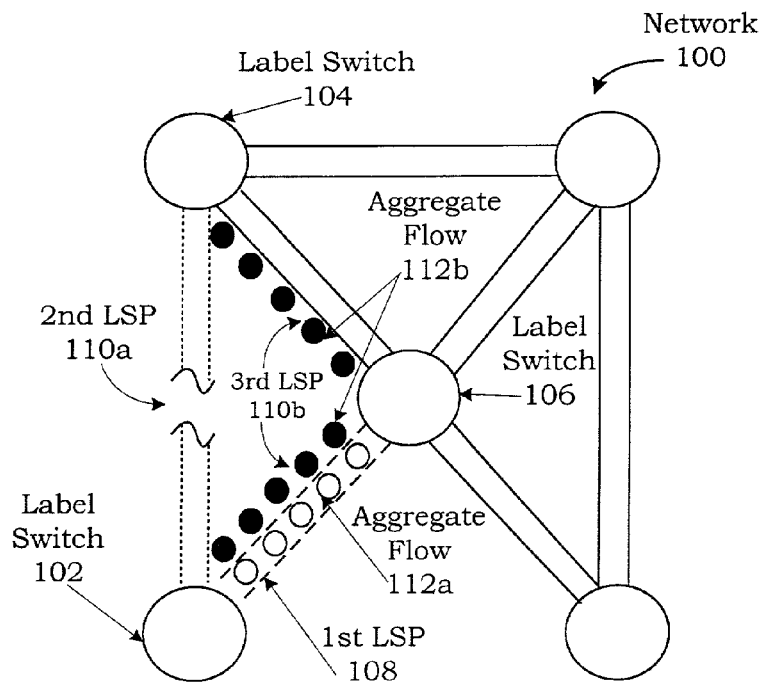
FIG. 1B is an illustration of a conventional LSP based network having an unusable LSP.
Figure 2A:
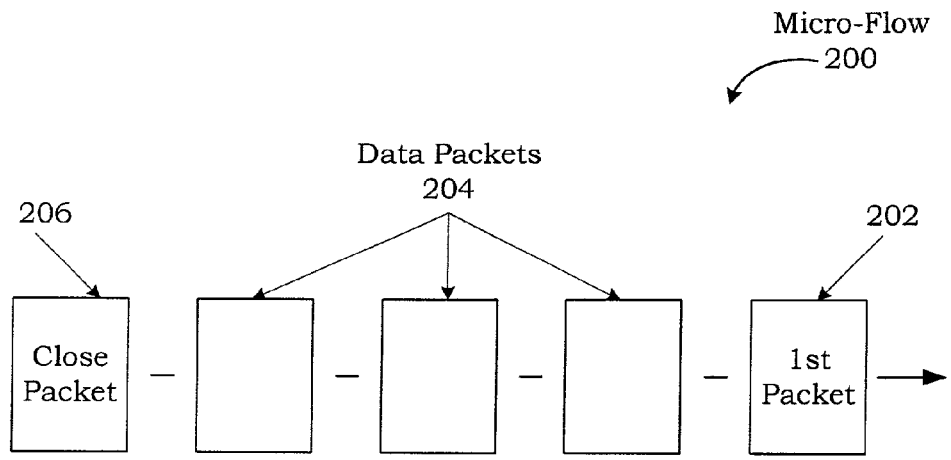
FIG. 2A is an illustration showing a micro-flow, in accordance with an embodiment of the present invention.

To route data at increased transfer speeds, an embodiment of the present invention converts received data packets into micro-flows and forwards them via the micro-flow LSP network domain. FIG. 2A is an illustration showing a micro-flow 200, in accordance with an embodiment of the present invention. The micro-flow 200 includes a first micro-flow data packet 202, optional subsequent data packets 204, and a close packet 206. The micro-flow 200 may include any number of subsequent data packets 204, including zero subsequent data packets 204, however each micro-flow preferably includes a first micro-flow packet 202 and a close packet 206.

Each micro-flow 200 is a group of data packets (e.g., IP data packets) from a single transmission, wherein each data packet in a single micro-flow includes the same source address, destination address, source port, destination port, and protocol type. In addition, each packet in the micro-flow 200 follows the preceding packet by no more than a predetermined amount of time, for example 2 milliseconds (ms).

Each micro-flow 200 also has a maintained state associated with each micro-flow describing link utilization characteristics of the LSP used to transmit the micro-flow 200, provided by an intelligent feedback mechanism. In this manner, the source can make an intelligent selection of the micro-flow LSP based on utilization information. This allows the label switch to continuously manage the traffic within the micro-flow LSP network domain in an efficient manner.

Although the following description focuses on IP data packets for illustrative purposes, the embodiments of the present invention may apply equally to other protocols, such as ATM, frame relay, etc.

The micro-flow 200 is routed through the micro-flow LSP network domain using a micro-flow label and QoS descriptors that are created upon arrival of the micro-flow at the micro-flow LSP network domain.

Figure 2C:
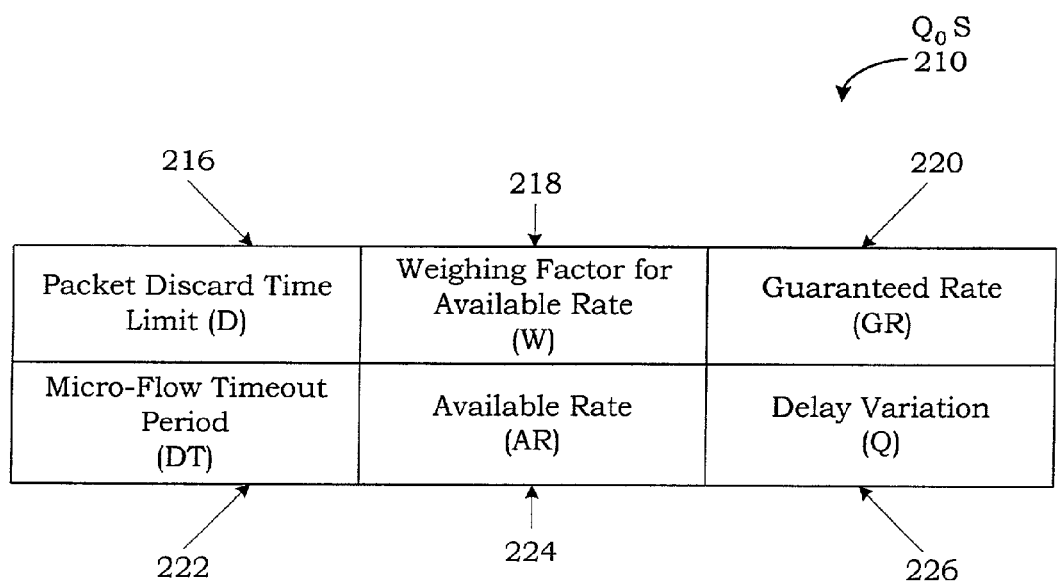
FIG. 2C is block diagram showing the QoS field of the first micro-flow data packet of a micro-flow, in accordance with an embodiment of the present invention.
Figure 2B:
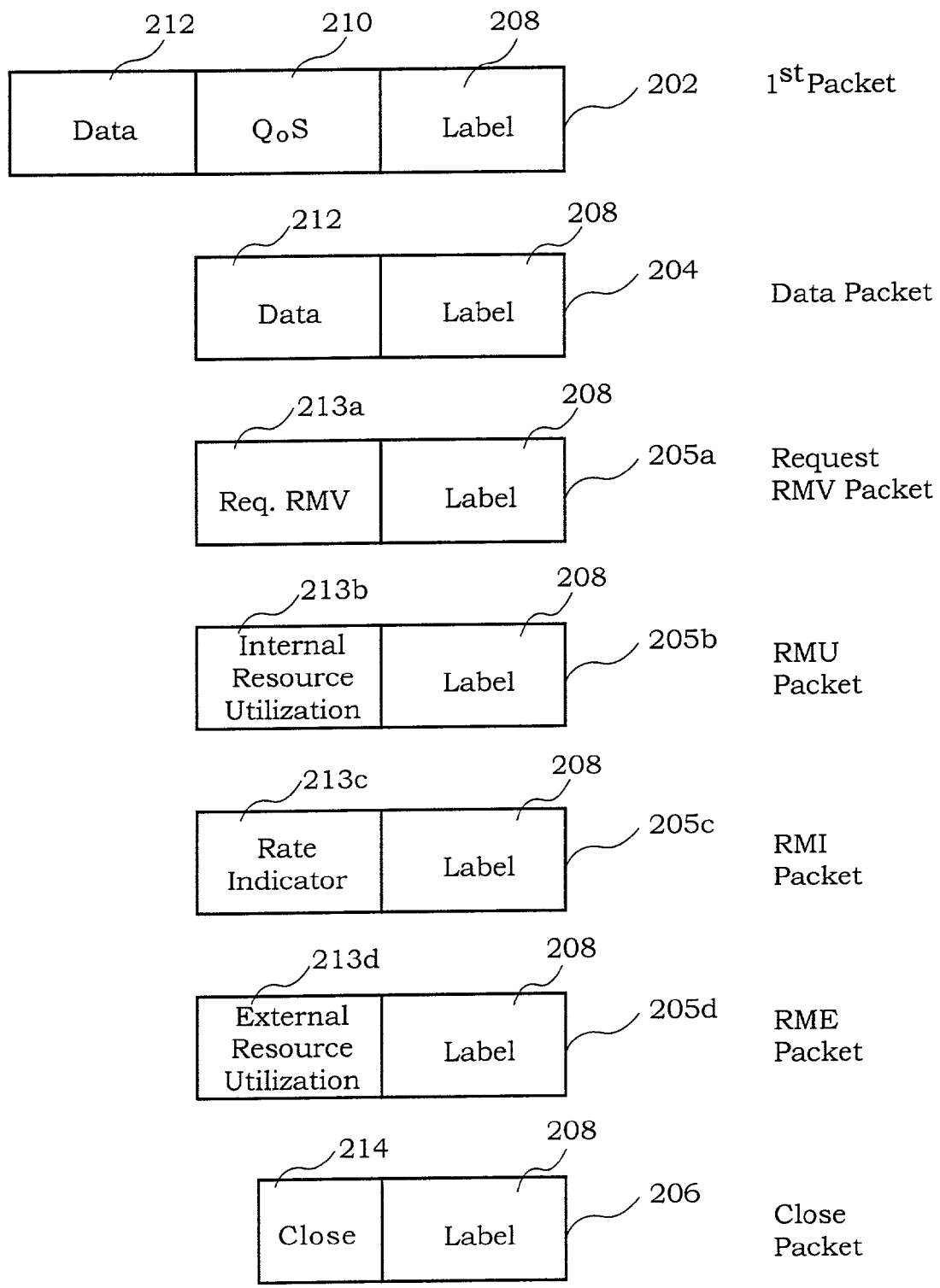
FIG. 2B is an illustration showing a detailed view of a micro-flow, in accordance with an embodiment of the present invention.

FIG. 2B is an illustration showing a detailed view of a micro-flow 200, in accordance with an embodiment of the present invention. The micro-flow 200 includes a first micro-flow data packet 202, an optional subsequent data packet 204, and a close packet 206. In addition, a request RMU packet 205*a*, a RMU packet 205*b*, a RMI packet 205*c*, and a RME packet 205*d* are shown. As stated previously, the micro-flow 200 may include any number of subsequent data packets 204, including zero subsequent data packets 204, however each micro-flow preferably includes a first micro-flow packet 202 and a close packet 206. The use of the request RMU packet 205*a*, the RMU packet 205*b*, the RMI packet 205*c*, and the RME packet 205*d* will be described subsequently.

The first data packet 202 of the micro-flow 200 includes a label field 208, a QoS field 210 and a data field 212. Thereafter, each subsequent data packet 204 includes a label field 208 and a data field 212. Finally, the close packet includes a label field 208 and a close field 214. As described in greater detail below, the close field 214 of the close packet 206 is used to instruct a switch to terminate an already established micro-flow that is present in the network.

Within the above described packets, the data field 212 generally includes the entire content of the data packet received at the ingress label switch of the micro-flow LSP network domain. However, in one embodiment, the data field 212 may include only a portion of the data packet. To create a micro-flow data packet, an embodiment of the present invention adds the label field 208, and the QoS field 210 to the first data packet received.

The label field 208 is used by the micro-flow LPS network domain to differentiate data packets of one micro-flow from data packets of another micro-flow, and to associate each data packet in a micro-flow with its assigned QoS characteristics. Generally, the label field 208 represents the OSI network and transport layer characteristics of the data packets from a single micro-flow 200. In one embodiment, the characteristics include the protocol type, the source address, the destination address, the source port, and the destination port associated with each data packet. It should be noted that the information used to differentiate data packets of one micro-flow from another can be based on other information types including real time protocol (RTP), MPLS or Differentiated Services (DiffServ) identifiers, or other information relating to a characteristic that is unique to the data packets of a specific micro-flow.

FIG. 2C is block diagram showing the QoS field 210 of the first micro-flow data packet of a micro-flow, in accordance with an embodiment of the present invention. The QoS field 210 includes a set of QoS descriptors that describe QoS constraints of the related micro-flow. Specifically, the QoS field 210 can include a packet discard time limit (D) value 216, a weighing factor (W) 218, a guaranteed rate (GR) value 220, a micro-flow timeout period (DT) value 222, an available rate (AR) value 224, and a delay variation value (Q). Based upon these QoS descriptors, the behavior of the micro-flow can be characterized as one of three basic service types, specifically, available rate (AR) traffic, maximum rate (MR) traffic, or guaranteed rate (GR) traffic. Of course, other service types may also be incorporated, as will be apparent to those skilled in the art.

Available Rate (AR) Traffic is micro-flow traffic that does not have real-time requirements, resulting in loose delay and jitter characteristics. In addition, due to the connection-oriented nature of AR traffic on the transport-layer, AR traffic has relatively relaxed loss prerequisites. Most transmission control protocol (TCP) micro-flows are examples of AR traffic.

Maximum Rate (MR) Traffic is micro-flow traffic that has real-time characteristics, resulting in rigid delay and jitter requirements. Further, MR traffic is sensitive to traffic loss. An example of MR traffic is user datagram protocol (UDP) micro-flows, particularly when carrying voice or video (e.g., Real-Time Protocol (RTP)). MR traffic QoS generally is determined at the time of arrival at the switch. MR traffic may represent real-time intensive traffic wherein the source and destination are unknown, such that it cannot be pre-configured ahead of time. Thus, to determine the QoS service type for MR traffic, the arrival time of the MR traffic is monitored at the ingress portion of the switch. Thereafter, a determination is made based on the arrival time of the MR traffic as to what the QoS service type should be for a particular micro-flow.

Guaranteed Rate (GR) Traffic is similar to MR traffic in its characteristics, and has strict requirements on delay, jitter, and loss. However, GR traffic has the desired rate communicated to the micro-flow LSP network by the user. This communication can be done by either explicit signaling or by user-defined traffic profiles. Thus, the guaranteed rate is well specified.

Referring back to FIG. 2C, the QoS descriptors of the QoS field 210 will now be described. The packet discard time limit (D) value 216 is used to ensure buffer availability with a label switch. This value is a parameter that can operate like a burst tolerance that allows the switches of the micro-flow LSP network domain to have a basis for policing micro-flows. In one embodiment, the D value can be between 10 ms and 500 ms. The D value typically is set to a large value, such as 400 ms, for AR traffic. For MR traffic and GR traffic, such as real-time voice or video, the D value 216 typically is set to about 50 ms.

The micro-flow timeout period (DT) value 222 is used to ensure that the micro-flow is terminated after a specified period of time. In particular, the DT value 222 ensures that the switches of the micro-flow LSP network domain can terminate a micro-flow after a particular amount of time if the close packet associated with the micro-flow is lost in transit. In one embodiment, the DT value 222 can be a value ranging between 0 and 32 seconds. When there is a need for a micro-flow not to be discarded, the DT value 222 typically is set to a relatively large value.

To ensure that micro-flows, which are no longer being transmitted across the network, are removed from each switch, either the close packet 206 or the DT value is used. The close packet 206 includes a label 208 corresponding to a specific micro-flow, and is used to instruct a switch to terminate an established micro-flow. Alternatively, a switch can use the DT value 222 of a micro-flow to determine when to time out the micro-flow.

The available rate (AR) value 224 initially is assigned based upon the classification of the micro-flow and the assignment of specific QoS criteria. This field typically is calculated differently depending on the traffic type (AR, MR, GR) to which the micro-flow belongs.

The weighing factor (W) value 218 is associated with AR traffic and indicates the share of the bandwidth available for AR traffic that can be delegated to the particular micro-flow as compared to other AR traffic micro-flows. The W value 218 typically is dynamically set according to pre-existing resource allocation on the switch. The W value 218, therefore, can permit the network to offer faster service for micro-flows associated with users who are willing to pay more for increased bandwidth. In addition, for AR traffic, the W value 218 can be dynamically set. For MR and GR traffic, the W value 218 typically is set to zero.

The delay variation (Q) value 226 represents the delay tolerance of the micro-flow, and typically is between about 1 microseconds and about 200 microseconds, and can be set to be less than about 30 microseconds. This parameter can be set to a relatively large value, such as 100 ms, for AR traffic, or to a smaller value for MR and GR traffic.

By using these per flow state-based QoS descriptors, a switch within the micro-flow LSP network domain can rely upon a queuing technique, such as weighted fair queuing (WFQ), to adjust the transmission rate of each micro-flow as needed to ensure that the QoS of each micro-flow is achieved.

Figure 3:
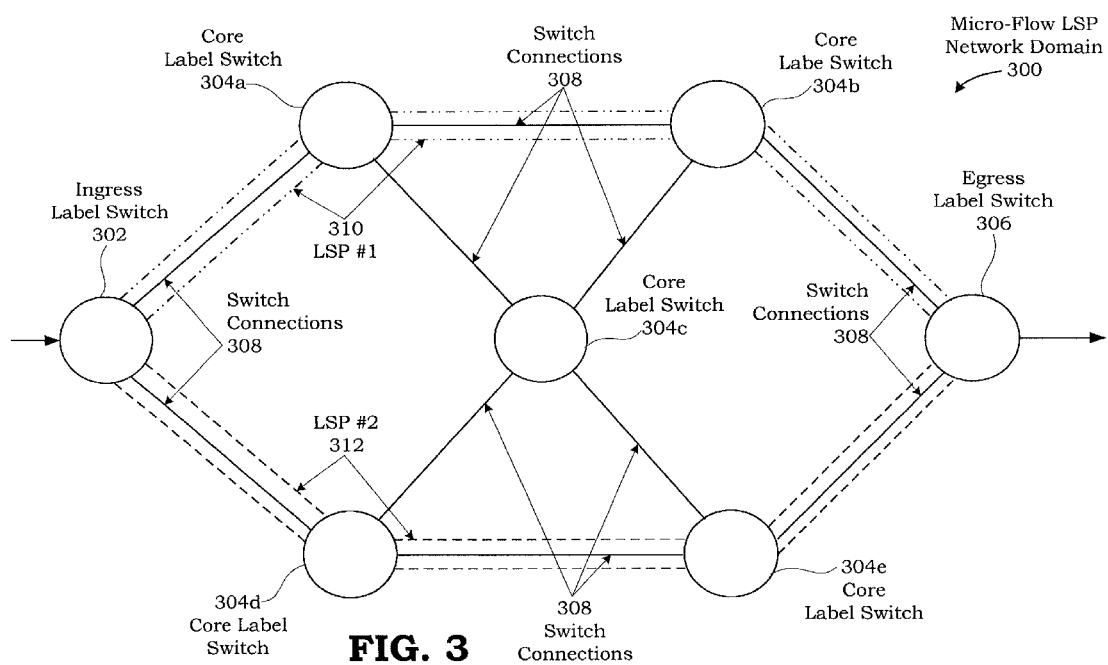
FIG. 3 is an illustration showing an exemplary segment of a micro-flow LSP network domain, in accordance with an embodiment of the present invention.

An embodiment of the present invention routes the above-described micro-flows to their intended destinations utilizing a micro-flow LSP network domain. FIG. 3 is an illustration showing an exemplary micro-flow LSP network domain 300 in accordance with an embodiment of the present invention. The micro-flow LSP network domain 300 includes an ingress label switch 302, core label switches 304*a–e*, an egress label switch 306, physical switch connections 308 (links), LSP #1 310, and LSP#2 312. Optionally, LSP #1 310 and/or LSP #2 312 can be assigned various Forward Equivalence Classes (FECs) by the network operator. In addition, the micro-flow LSP network domain 300 optionally may be coupled to a conventional network via the ingress label switch 302 and the egress label switch 306. It should be noted that the physical switch connections 308 can be any connection that links the switches together, including wireless connections (links).

In use, flow data arriving at the ingress label switch 302, typically from a host or a conventional network, is forwarded through the micro-flow LSP network domain 300 using LSP #1 310 and LSP #2 312. More specifically, flow data arriving at the ingress label switch 302 is converted to a micro-flow, assigned a QoS service type, and optionally, a FEC. Thereafter, an LSP is selected for the micro-flow within the constraints of the assigned FEC, if any, based on the QoS service type of the micro-flow and the link utilization of the LSPs. The micro-flow then is forwarded through the micro-flow LSP network domain 300 using the selected LSP.

Figure 4A:
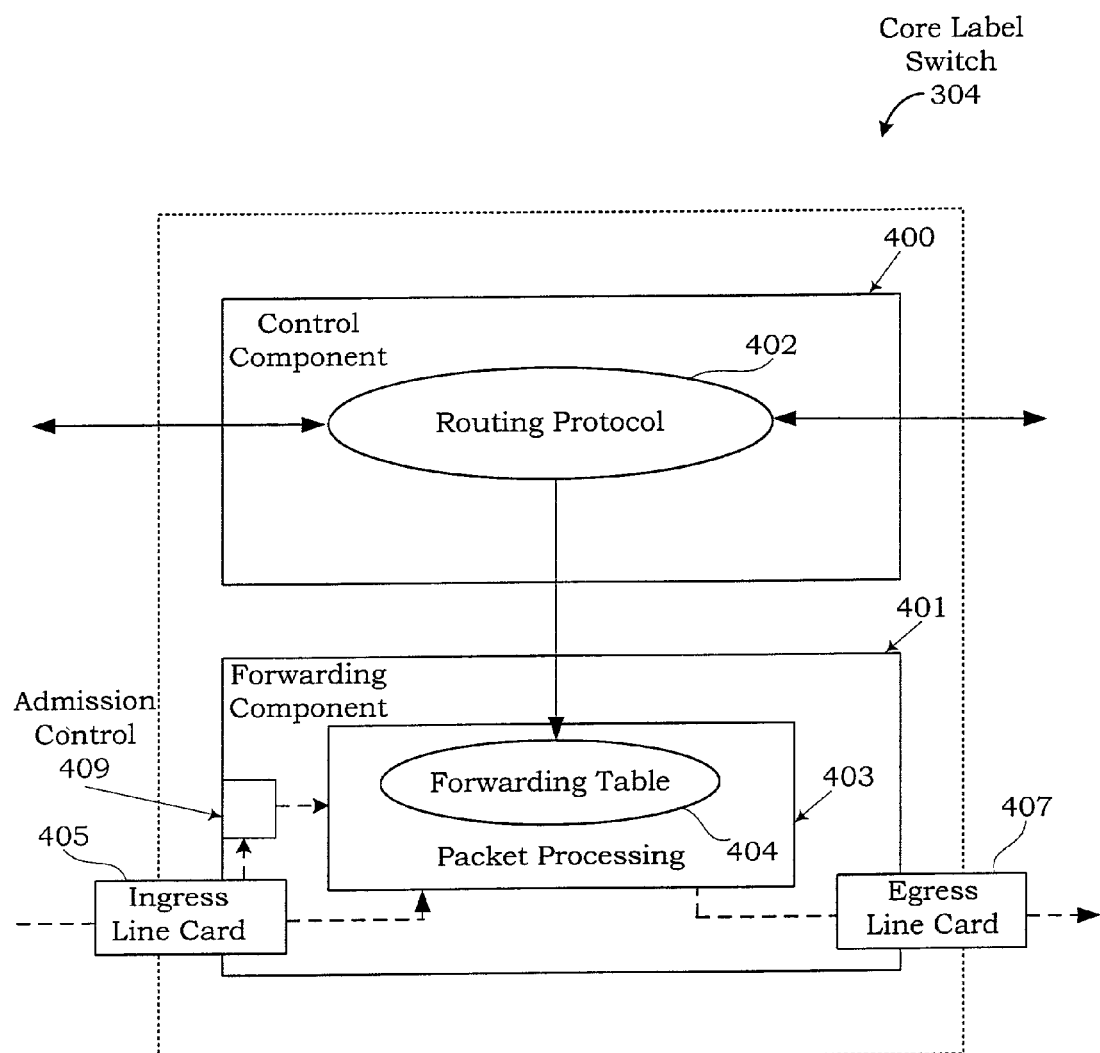
FIG. 4A is a high-level block diagram showing the functional components of a core label switch, in accordance with an embodiment of the present invention.

In one embodiment, once an appropriate LSP has been selected the micro-flows are routed through the core label switches 304*a–e* of the LSP using a label swapping technique, described in greater detail subsequently. FIG. 4A is a high-level block diagram showing several of the functional components of a core label switch 304, in accordance with an embodiment of the present invention. The core label switch 304 includes a control component 400 and a forwarding component 401. The control component 400 includes a routing protocol 402, and the forwarding component 401 includes an admission control component 409, and a packet processing function 403 having a forwarding table 404. The core label switch 404 is coupled to the network of switches via an ingress line card 405 and an egress line card 407. It should be borne in mind that the label switch 404 may have a plurality of ingress line cards 405 and egress line cards 407. For ease of explanation, however, only one of each is shown in FIG. 4A. In one embodiment, the admission control component 409 is only within the ingress switch 302.

In operation, the control component 400 uses the routing protocol 402 to exchange information with other switches to build and maintain the forwarding table 404. When the first packet of a micro-flow 200 arrives at the ingress line card 405, the admission control component 409 determines the label switch's 304 ability and resources to process the micro-flow 200. If the switch 304 is able to process the micro-flow 200, the forwarding component 401 searches the forwarding table 404 maintained by the control component 400 to make a routing decision for each packet. Specifically, the forwarding component 401 examines information included in the packet's header, searches the forwarding table 404 for a match, and directs the packet from the ingress line card 405 to the appropriate egress line card 407. Subsequent data packets after the first packet of the micro-flow 200 bypass the admission control component 409.

More particularly, micro-flows are routed through an LSP in an embodiment of the present invention by use of a label, (e.g., FIG. 2, label 208), which is carried in a packet's header to identify an FEC, QoS, and other characteristics of the packet. As shown in FIG. 3, the ingress label switch 302 of the micro-flow LSP network domain 300 assigns a label to each packet of a new micro-flow. Thereafter, the core label switches 304 of the micro-flow LSP network domain 300 ignore the packet's network layer header and simply forward the packet using its assigned label.

Referring to FIG. 4A, when a packet arrives at a core label switch 304, the forwarding component 401 uses the input port number and label to perform an exact match search of its forwarding table 404. When a match is found, the forwarding component 401 retrieves an outgoing label, an outgoing interface, and a next-hop address from the forwarding table 404. The forwarding component 401 then replaces the incoming label with the outgoing label and directs the packet to the outbound interface for transmission to the next hop in the LSP.

When the labeled packet arrives at the egress label switch 306, the forwarding component 401 of the egress label 306 switch searches its forwarding table 404. If the next hop is not a label switch, the egress label switch discards the label and forwards the packet using conventional longest-match IP forwarding.

Referring back to FIG. 3, when a data packet arrives at the ingress label switch 302 of the micro-flow LSP network domain 300, micro-flow specific headers are added to the packet. Specifically, the ingress label switch 302 parses the packet to extract the network layer, such as the protocol type, the source address, and the destination address, and transport layer information necessary to select a LSP to use for routing across the micro-flow LSP network domain 300. This information then is used to create a micro-flow label 208 that uniquely identifies the micro-flow.

If the data packet is part of an existing micro-flow, the ingress label switch 302 uses the information related to that micro-flow to route the packet through the network 300. Otherwise, the ingress switch 302 creates a new micro-flow by populating a label with QoS information.

Once the micro-flow is classified into one of the three service types (AR, MR, or GR), the ingress label switch 302 selects a LSP for transmission of the micro-flow, based on the micro-flow's service type.

For AR traffic, the switch 302 selects a LSP based on the bandwidth available for AR traffic on each LSP of the switch 302. This bandwidth is represented by an "Available Rate Per Weight" (ARPW) value, which is defined as a multiplier index that is used to determine the fraction of the LSP bandwidth to be available for the AR traffic. There may be a plurality of LSPs that will satisfy the IP destination, QoS, and customer service level agreement (SLA) requirements of any particular Available Rate micro-flow. Out of these possible choices, the ingress line card of the ingress node selects a LSP having the best ARPW parameter.

In one embodiment, the criteria for selecting a LSP for GR and MR micro-flows is based on the available bandwidth and priority for GR or MR traffic for the particular LSP. This rate is represented by a "Remaining Guaranteed Capacity" (GC) and a "Total Guaranteed Allocation" (GA) parameters of each line card. The Guaranteed Capacity parameter is the capacity of supporting GR and MR traffic that any LSP can sustain, while guaranteed allocation is the sum of the guaranteed bandwidth for all GR and MR micro-flows that are being serviced by a particular LSP. As with AR traffic, there may be a plurality of LSPs that will satisfy both the destination and QoS requirements of any particular GR or MR micro-flow. Out of these possible choices, the ingress line card of the ingress node selects the LSP whose egress line card has the best GC and GA parameter combinations.

As previously stated, a micro-flow may include additional FEC information, as well as QoS information. The QoS information determines which QoS service type to assign to the micro-flow, either GR, MR, or AR. If included, the FEC information provides additional constraints for transmitting the micro-flow. These constraints may include a particular set of LSPs that must be used to transmit the micro-flow, minimum LSP bandwidth requirements, or other constraints desired by the network provider. When determining which LSP to select for micro-flow transmission, an embodiment of the present invention preferably selects a LSP from among the set of LSPs satisfying any additional FEC constraints associated with the micro-flow. The ingress label switch 302 selects a LSP from among this set based upon the micro-flow destination, QoS service type for the micro-flow, and LSP load balancing, discussed in greater detail subsequently.

Based on the micro-flow destination, the ingress label switch 302 determines a set of selectable LSPs that provide access to the micro-flow destination and satisfy any customer SLA FEC constraints associated with the micro-flow. The ingress label switch 302 then selects a specific LSP for micro-flow transport from among this set based on QoS and load balancing.

Figure 4B:
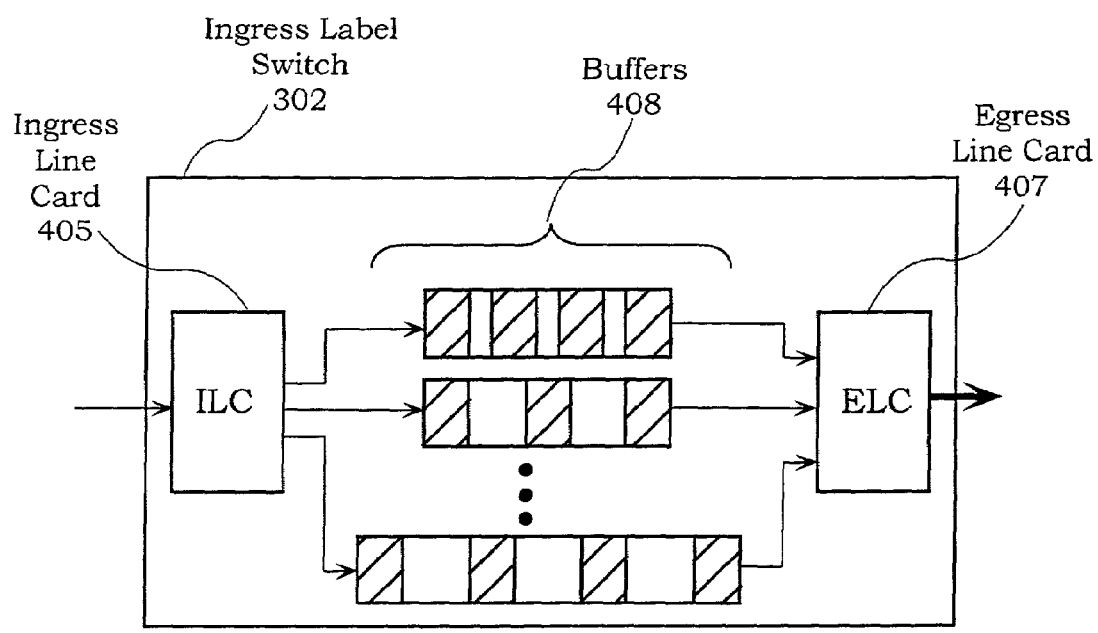
FIG. 4B is a block diagram of an ingress label switch, in accordance with an embodiment of the present invention.

FIG. 4B is a high level block diagram of an ingress label switch 302, in accordance with an embodiment of the present invention. The ingress label switch 302 includes an ingress line card 405, and egress line card 407 and a plurality of buffers 408. During operation, micro-flows are placed into particular buffers 408 based on the assigned rate, which is based one QoS and a weighting factor (W).

More specifically, each buffer 408 is configured to allow data packet transmission at a particular rate. The ingress line card 405 determines a flow rate for a particular micro-flow based on a received RMI packet associated with each micro-flow. The ingress line card 405 therefore sends the data packets of the micro-flow to the appropriate buffer 408. Data packets from the micro-flow are then transmitted through the internal fabric of the ingress label switch 302. In one embodiment, the buffers 408 are configured to stack up traffic and be controlled by a scheduler which enables the desired flow shaping. In addition to shaping, policing is enforced by not allowing more than a particular rate for a particular micro-flow. In yet another embodiment, the traffic parameters that are used for the shaping and policing are the QoS parameters, such as, jitter, delay, packet burst size and bandwidth, for example.

Figures 1, 4C:
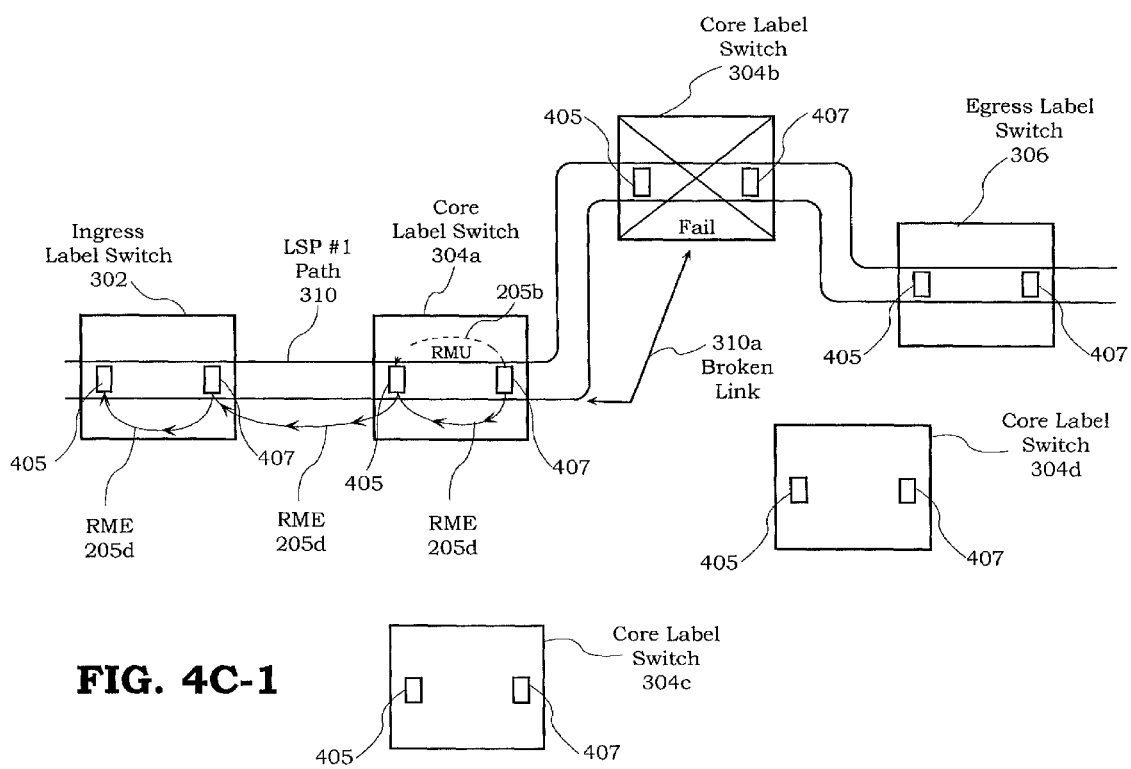
FIGS. 4C-1 shows an exemplary segment of a micro-flow LSP network domain experiencing a failure, in accordance with an embodiment of the present invention.

FIGS. 4C-1 shows an exemplary segment of a micro-flow LSP network domain experiencing a node failure, in accordance with an embodiment of the present invention. The micro-flow LSP network domain includes an ingress label switch 302, an egress label switch 306, and a plurality of core label switches 304. Each switch includes an ingress line card 405 and an egress line card 407. In addition, a LSP #1 310 has been configured along the ingress label switch 302, core label switches 304a and 304b, and the egress label switch 306.

In the example of FIGS. 4C-1, the core label switch 304b has experienced a failure, and thus is no longer capable of routing traffic to the egress switch 306. This in turn causes the prior core label switch 304a to detect a broken link 310a between the core label switch 304a and 304b. In one embodiment of the present invention, in response to detecting the broken link 310a at the egress line card 407 of core label switch 304a, the egress line card sends a signal in the form of an internal resource utilization packet (RMU) 205b to the ingress line card 405 of core label switch 304a. In addition, a signal in the form of an external resource utilization packet (RME) 205d is sent to the ingress line card 405 of the ingress label switch 302, e.g., the source.

Figures 2, 4C:
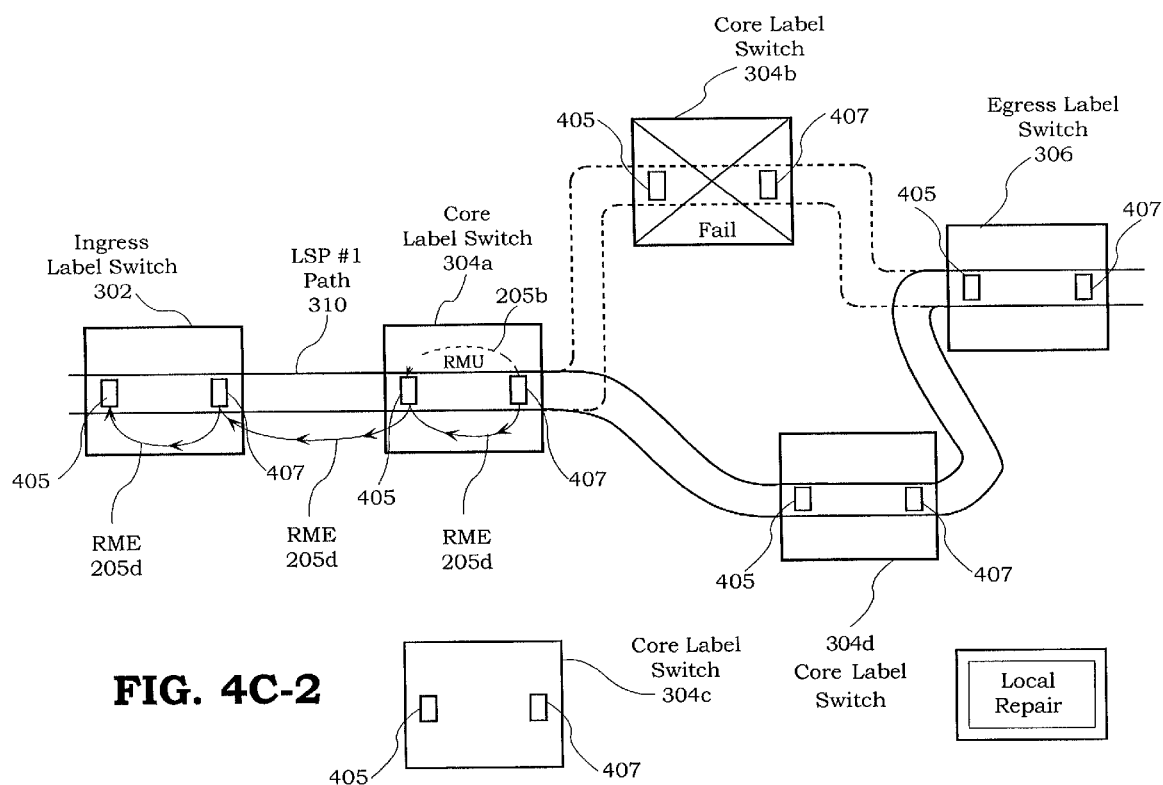
Figures 3, 4C:
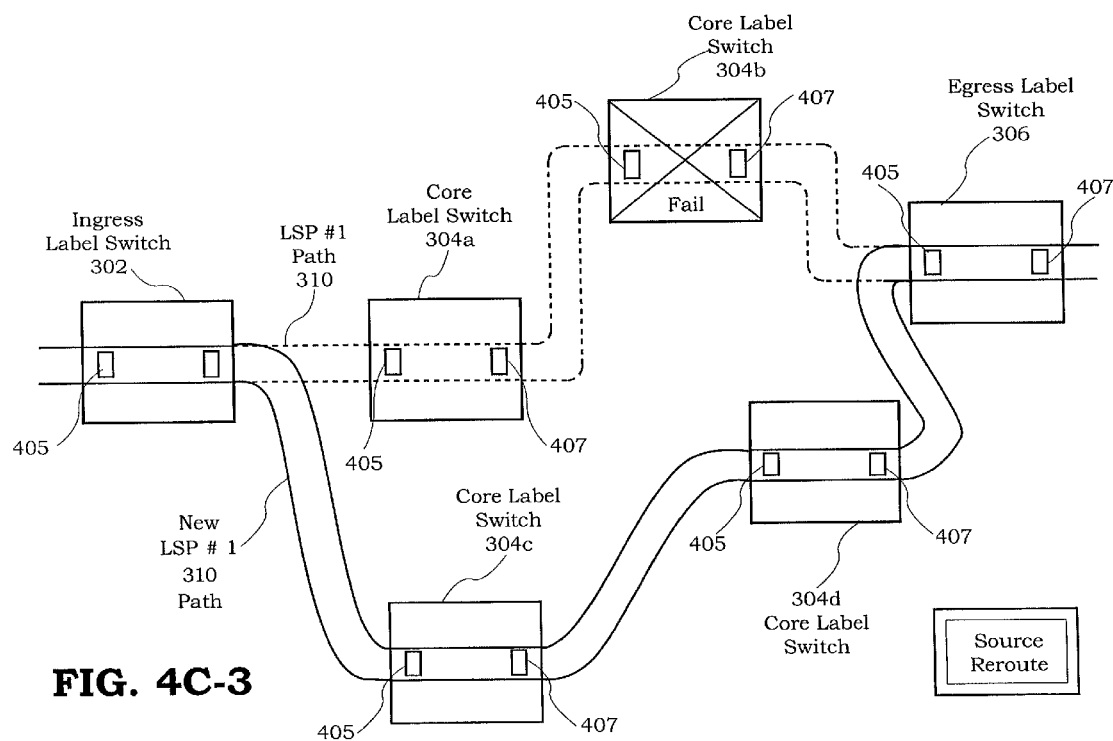

In response to receiving the RMU packet 205b, the ingress line card of core label switch 304a determines a new local repair path to route remaining traffic to egress label switch 306. FIGS. 4C-2 is an illustration showing the exemplary segment of a micro-flow LSP network domain performing a local repair, in accordance with an embodiment of the present invention. As shown in FIGS. 4C-2, the ingress line card 405 of the core label switch 304a chooses an alternate path to route traffic from core label switch 304a to the egress label switch 407. In this example, the alternate path will now include core label switch 304d and thus bypass the core label switch 304b. It should be noted that FIGS. 4C-2 illustrates a local repair, which can stay in place or can be a temporary reroute of traffic. In an embodiment where the path is temporary, the temporary alternate path is used until the ingress line card 405 of the ingress label switch 302 performs a source reroute, as discussed next with reference to FIGS. 4C-3.

FIGS. 4C-3 is an illustration of the exemplary segment of a micro-flow LSP network domain performing a source reroute, in accordance with an embodiment of the present invention. In response to receiving signal in the form of the RME packet 205d, the ingress line card 405 of the ingress label switch 302, determines a new route to the egress label switch 306 from the ingress label switch 302. The ability to reroute from the ingress label switch 302 allows for enhanced path selection because more optimal path choices, based on least utilized LSPs and the like, are available to the ingress label switch 302 than are available to the core label switch 304a. This is because a particular core label switch 304 may be too close to the egress switch and fewer optimal reroute LSP paths will be available.

The Utilization Resource Management (RMU) packet, Internal Resource Management (RMI) packet, and External Resource Management (RME) packet are further used by embodiments of the present invention to obtain resource utilization information for load balancing. Specifically, embodiments of the present invention use load balancing to distribute micro-flow traffic in a manner that best utilizes the LSPs available for transmitting micro-flows to their destinations. Load balancing is performed using GR/MR/AR rate information obtained from the resource management packets.

The RMI and RMU packets provide intra-switch traffic management information, while the RME packet provides inter-switch traffic management information, and in particular, reactive traffic management. The RMI and RME packets perform flow control and rate adjustment over an in-service traffic flow internally and externally as according to the network traffic condition. The RMU provides proactive traffic management by performing internal switch resources utilization monitoring on all routes between any ingress port and egress port within a switch. When a label switch is performing intra-routing, the RMU information is used to select routes between the ingress line card interface and the egress line card interfaces.

Since the information represented by the RMU includes the egress line card interface and port utilization, the RMU provides intra-switch resources management information and also is applicable to inter-switch resource management. This information is beneficial for supporting inter-routing.

The RMI provides rate adjustment on an active micro-flow within the ingress label switch 302. RMI execution is triggered by the first packet of the micro-flow received at the egress line card of the ingress switch 302. When the RMI packet is generated, the RMI packet includes the least amount of available bandwidth along the path back to the ingress interface. The RMI packet is sent from the egress line card to the ingress line card. Each hop along the internal path adjusts the rate accordingly. The ingress line card then either adjusts the internal available rate or selects another path if the new rate is not acceptable to the service class of the micro-flow. Anytime the incoming traffic rate is changed, a new RMI packet is generated to readjust the rate.

The RME packet is similar to RMI packet, except that it facilitates rate adjustment on an active micro-flow across the entire micro-flow LSP network domain 300. The RME is triggered by the very first packet of the micro-flow received at the egress label switch's 306 egress line card. When the RME packet is generated, the RME packet carries back to the ingress label switch 302 the set of the most constraint available rates as well as the guaranteed rate for the given service class along the intermediate hops of the micro-flow's selected LSP. The ingress label switch's 302 ingress line card then either adjusts the rate or selects a new path if the new rate is not acceptable to the service class of the micro-flow. Optionally, the RME may be generated periodically to identify the resource utilization status and path condition.

An embodiment of the present invention maintains traffic levels on each LSP between set utilization threshold values to reduce the potential for, and the impact of, congestion within an LSP. RMU, RMI, and RME packets typically are received by the ingress line card interface within the ingress label switch 302. The ingress label switch 302 then utilizes this information to determine which LSP, from among the set of selectable LSPs, has the least utilization. The ingress label switch 302 then transmits the micro-flow through the least utilized LSP using its egress line card. In this manner, LSPs are utilized in an intelligent manner to keep network congestion at a low level.

Once the forwarding information has been established, the ingress line card of the ingress switch 302 forwards the packet through the ingress switch 302 to the egress line card. At this point the egress line card transmits the packet, including an associated label 208 and QoS header 210 for the first packet of a new micro-flow, using the selected LSP.

When network congestion is detected an embodiment of the present invention generally decreases the outgoing data rate of lower priority traffic and directs new micro-flows away from the congested area.

Decreasing the outgoing data rate of lower priority traffic gives the congested LSP appropriate resources to recover from the problem. Higher priority traffic generally is unaffected. If high priority traffic is impacted, the traffic is redirected.

Because of the fluctuations in the traffic flows, redirection of micro-flow traffic can cause network instability, resulting in load balancing, reliability and operational problems. Therefore, upon detection of congestion, the ingress label switch 302 decreases the rate of the lower priority traffic while attempting not to alter the high priority flows. In the event that high priority traffic is compromised, redirection of the flows occurs. Preferably, no redirection of flows occurs unless some utilization thresholds are reached and the high priority traffic is affected. New micro-flows then are directed away from the congested area.

Figure 4D:
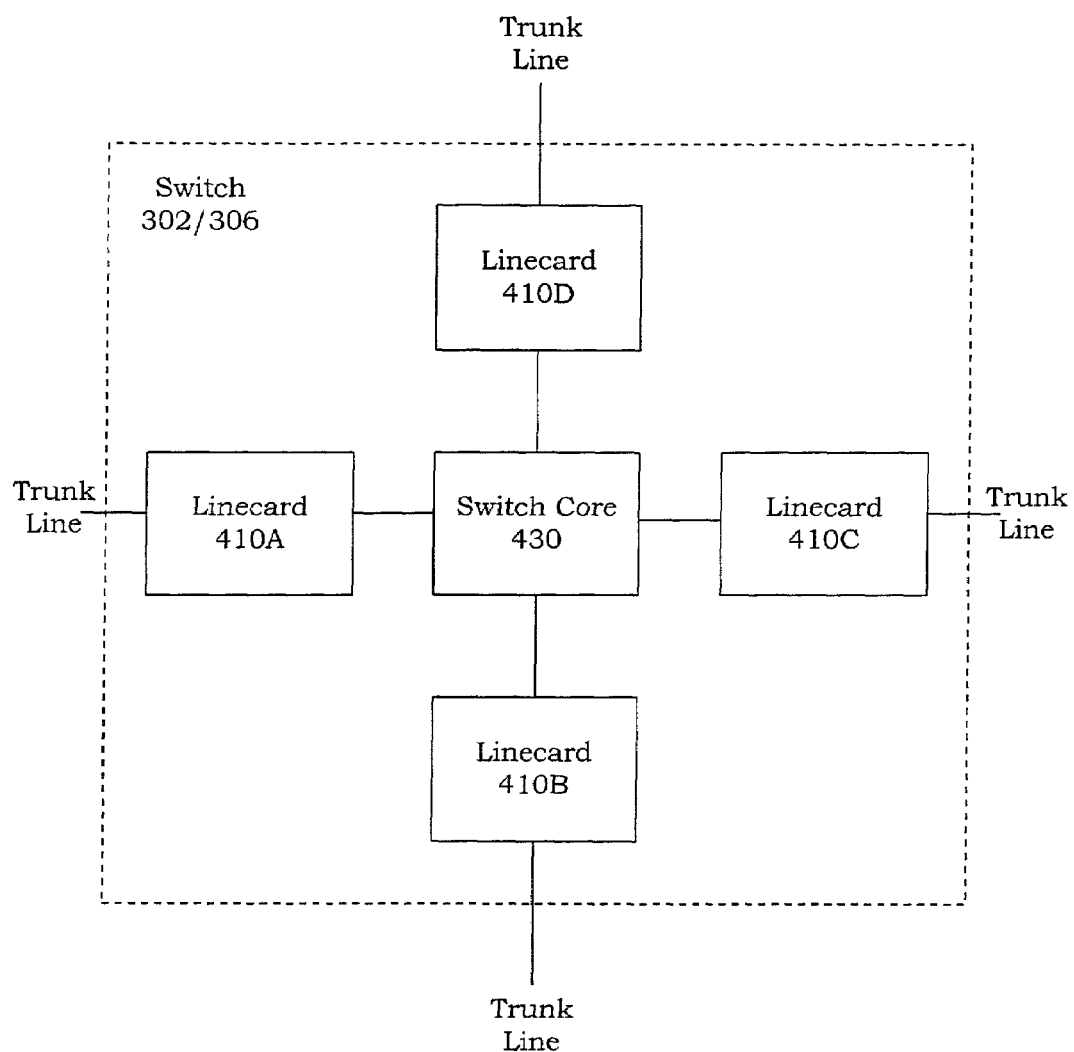
FIG. 4D is a high level block diagram of a network switch, in accordance with an embodiment of the present invention.

Referring next to FIG. 4D, a high level block diagram of a switch 302/306 within a network 300 of an embodiment of the present invention is shown. In one embodiment, the switch 302/306 can be utilized as an ingress switch and an egress switch. In a further embodiment, the switch 302/306 also can be used as a core switch.

The switch 302/306 includes a plurality of line cards 410 and a switch core 430. The line cards 410, which are coupled between the switch core 430 and the trunk lines, are responsible for processing data packets received either from the trunk lines or from the switch core 430. The switch core 430 operates as the switching fabric for the switch 302/306.

The ingress line card 410 (e.g., line card 410A) is responsible for receiving data packets from the trunk line. In addition, the ingress line card 410 determines the QoS characteristics as well as the internal path from the ingress line card 410 (e.g., line card 410A) to the egress line card 410 (e.g., line card 410C) for each micro-flow. Further, the ingress line card 410 forwards data packets across the fabric of the switch core 430 based upon the determined QoS information.

Unlike conventional networks 100, the ingress line card 410A merely needs to determine the QoS characteristics of a micro-flow once based upon information extracted from the first data packet of that micro-flow. Every other data packet received from this same micro-flow does not have its QoS characteristics or path information redetermined, but rather merely has the same QoS characteristics looked up and associated with these subsequent data packets.

The ingress line card 410A also utilizes the GR, AR and W values to ensure that no micro-flow is exceeding the rate assigned to that micro-flow. Should the data packet associated with that micro-flow be found to be exceeding its assigned rate, the data packet is discarded by the micro-flow. Should the data packet associated with a micro-flow be determined to be within its QoS constraints, the ingress line card 410A transmits the micro-flow data packets over the fabric of the switch core 430 to the egress line card 410C associated with the micro-flow.

The egress line card 410C is responsible for ensuring that the micro-flow data packets are transmitted over the trunk line coupled to the egress line card 410C within the QoS constraints assigned to the micro-flow. Unlike the ingress line card 410A, which is more concerned with ensuring that the data packets do not exceed its assigned rate, the egress line card 410C ensures that the micro-flow data packets are transmitted within the QoS constraints including its guaranteed rate and maximum delay variation.

It should be noted that the configuration of the switch 302/306 as illustrated in FIG. 4D can be modified in many different ways. For example, portions of the switch core 430 can be relocated onto each of the line cards 410 within the switch 302/306, thereby eliminating the need for a separate switch core 430 for the switching fabric. In addition, even though only one output port to a trunk line is illustrated for each line card, it should be noted that multiple output ports can be included within each line card 410, thereby allowing each line card to be connected to multiple trunk lines. In one embodiment, the output port(s) on the line card 410 can be optical carrier- ("OC-") 3, OC-12 OC-48 or OC-192 ports.

Figure 5:
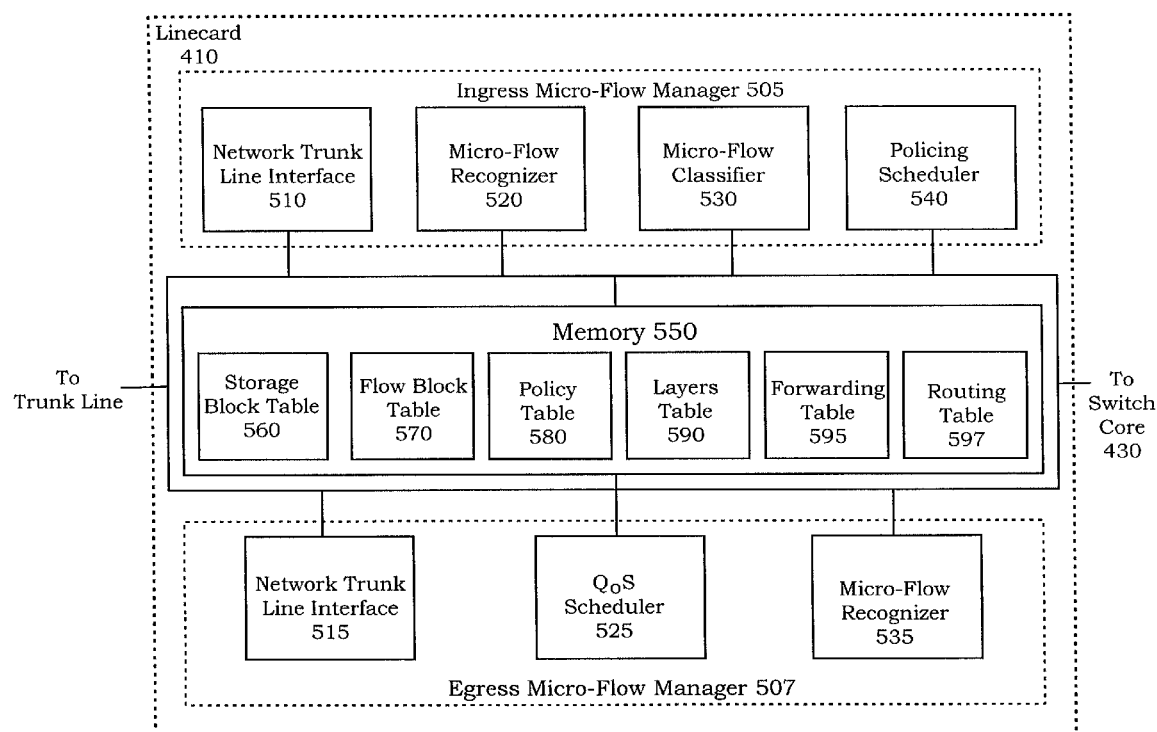
FIG. 5 is a block diagram of a line card, in accordance with an embodiment of the present invention.

FIG. 5 illustrates a more detailed high level block diagram of a line card 410 of the switch 302/306 of an embodiment of the present invention. Each line card 410 includes an ingress micro-flow manager 505, an egress micro-flow manager 507 and a memory 550.

The ingress micro-flow manager 505 includes a network trunk line interface 510, a micro-flow recognizer 520, a micro-flow classifier 530 and a policing scheduler 540. The egress micro-flow manager 507 includes a micro-flow recognizer 535, a QoS scheduler 525 and a network trunk line interface 515. The memory 550 includes a storage block table 560, a flow block table 570, a policy table 580, a layers table 590, a forwarding table 595 and a routing table 597.

It should be noted that for illustrative purposes only, one output port (not illustrated) is discussed as being connected to the trunk line. However, in alternative embodiments, a plurality of output ports on each line card 410 can enable the line card 410 to be coupled to a plurality of trunk lines.

In use, the ingress micro-flow manager 505, memory 550, and egress micro-flow manager 507 work together to transmit micro-flows across the fabric of the switch 302/306 as described in parent U.S. patent application Ser. No. 09/552,278, filed Apr. 19, 2000, entitled "MICRO-FLOW MANAGEMENT," now U.S. Pat. No. 6,54,195 which is hereby incorporated by reference in its entirety. In addition, the ingress micro-flow manager 505, memory 550, and egress micro-flow manager 507 work together to transmit micro-flows across the micro-flow LSP network domain 300 using LSPs.

The egress micro-flow manager 507 determines LSP utilization by counting, and recording the number of data packets that are transmitted along each LSP associated with the switch 302/306. This information then is used to shape micro-flows transmitted through the various LSPs coupled to the switch 302/306. In addition, the egress micro-flow manager 507 of an egress line card (e.g., line card 410C) feedback information to the ingress micro-flow manager 505 of the ingress line card (e.g., line card 410A) to police the micro-flows routed through the switch 302/306. Specifically, the information received by the ingress micro-flow manager 505 is used to adjust a rate at which to transmit received micro-flows through the switch core 430.

Figure 6A:
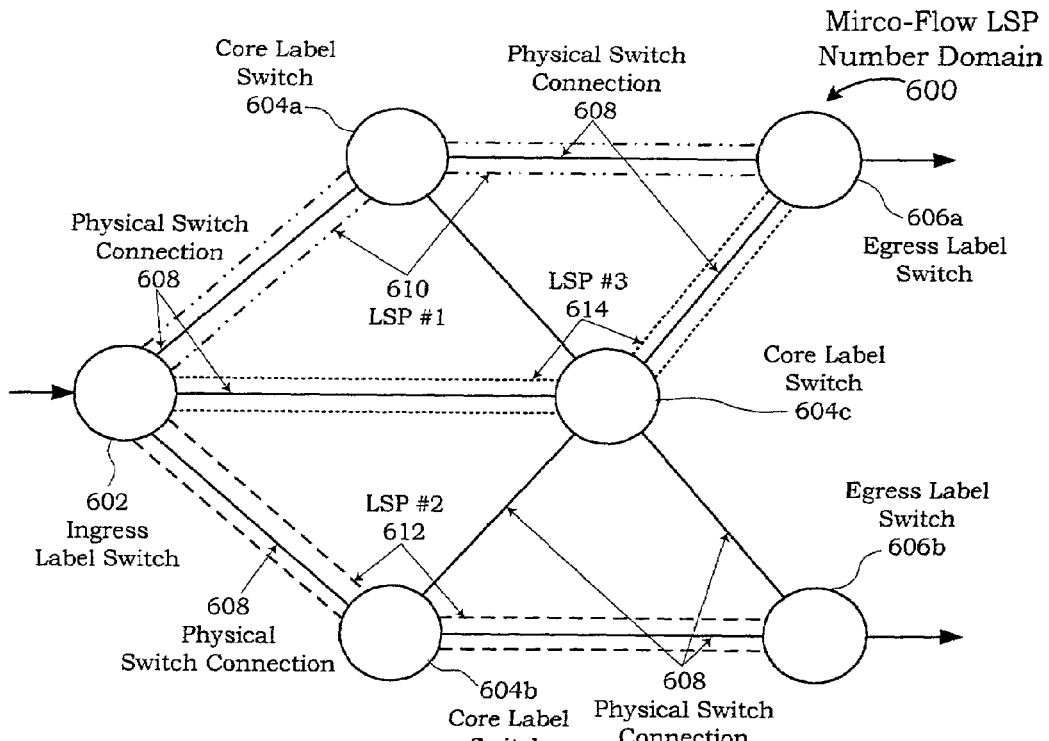
FIG. 6A is an illustration showing an exemplary segment of micro-flow LSP network domain, in accordance with an embodiment of the present invention.

FIG. 6A is an illustration showing an exemplary micro-flow LSP network domain 600, in accordance with an embodiment of the present invention. The micro-flow LSP network domain 600 includes an ingress label switch 602, core label switches 604*a–c*, egress label switches 606*a–b*, physical switch connections 608, LSP #1 610, LSP#2 612, and LSP#3 614. Optionally, LSP#1 610, LSP#2 612, and/or LSP#3 614 can be assigned various FECs by the network operator. In addition, the micro-flow LSP network domain 600 optionally may be coupled to a conventional network via the ingress label switch 602 and the egress label switches 606*a* and 606*b*.

By monitoring RME packets, the ingress label switch 602 can either reduce the transmission rate or switch to a less congested LSP in the event of network congestion. It should be borne in mind that resource management packets typically are sent in the reverse direction, specifically, from the egress switches 606*a* and 606*b* to the ingress switch 602. This reduces the need for forward resource management packets thus limiting the amount of signaling required for flow control across the network.

For example, if the ingress label switch 602 determines that LSP#3 614 is experiencing congestion, it will reduce the rate of AR traffic over LSP#3 614, while still maintaining the same micro-flow LSP and rate for the high priority traffic. However, if the higher priority traffic still is affected, the ingress label switch 602 will route packets over a new LSP, for example LSP #1 610, until the congestion is removed. The capability to rate control low-priority packets of a micro-flow, or to re-direct packets of new micro-flows over different LSPs greatly reduces network congestion.

Congestion is detected either via link utilization/loading information coming from dynamic routing protocols or through rate information in RME packets. Dynamic routing updates are on a per link basis while RMEs are on a per path basis. Inside the micro-flow LSP network domain, traffic extensions make this type of loading information available to dynamic routing software in the switch. Upon receipt of a link utilization change, a forwarding information base (FIB) update occurs to notify the system about what the new targets for link utilization should be. Link available rate changes coming from RME packets then cause an immediate update of the forwarding tables.

As GR/MR type traffic increases and becomes a greater percentage of overall link bandwidth, a congestion situation may result in impact to the GR/MR flows, causing them to be rerouted. To address this situation, a connection admission control mechanism can be provided to ensure that once a GR/MR flow is created the flow will not be impacted by switch congestion. In one embodiment, bandwidth for GR/MR flows is pre-allocated on alternate paths to guarantee that the bandwidth is available. Standard mission critical protection schemes can be used to provide a pre-determined restoration path with pre-allocated capacity.

Figure 6B:
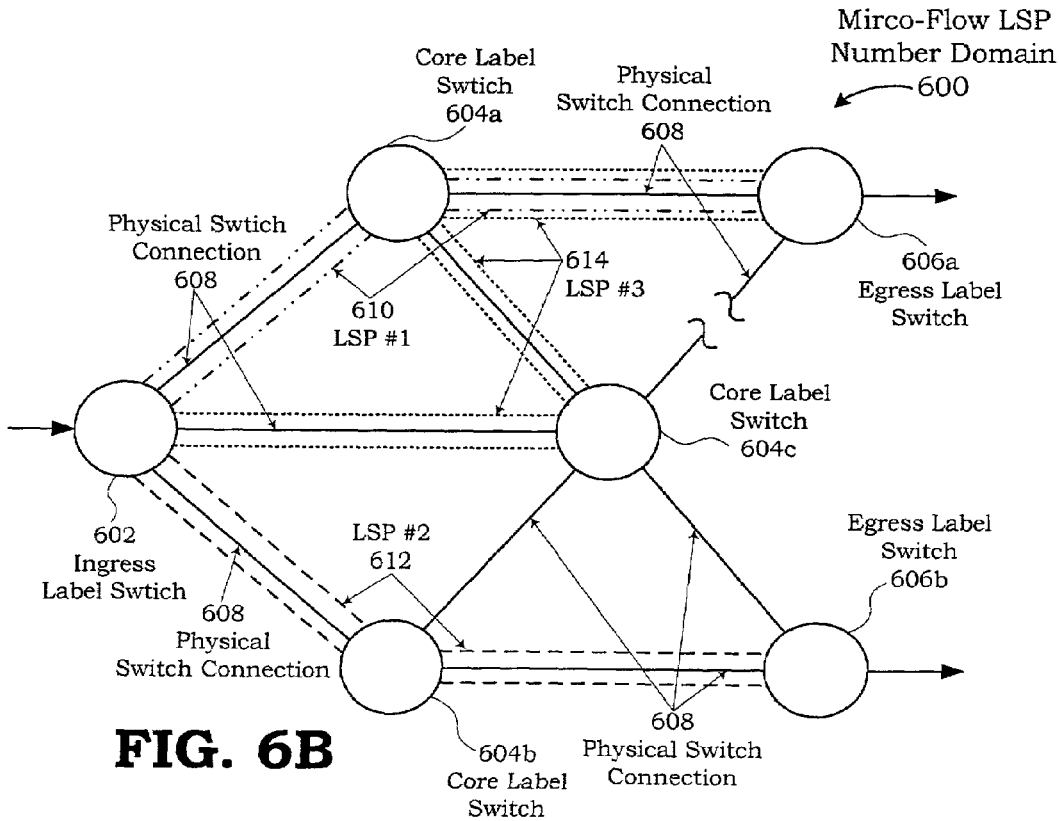
FIG. 6B is an illustration showing an exemplary micro-flow LSP network domain having a disabled LSP, in accordance with an embodiment of the present invention.

If a switch, line card, or trunk failure is detected anywhere inside the micro-flow LSP network domain, the next packet of each micro-flow is sent via an alternate route as if it was the first packet in a micro-flow, including label and QoS information attached. FIG. 6B is an illustration showing an exemplary micro-flow LSP network domain 600 having a disabled LSP, in accordance with an embodiment of the present invention. The micro-flow LSP network domain 600 includes an ingress label switch 602, core label switches 604*a–c*, egress label switches 606*a–b*, physical switch connections 608, LSP #1 610, LSP#2 612, and rerouted LSP#3

614. In the micro-flow LSP network domain 600 of FIG. 6B the connection between core label switch 604c and egress label switch 606a is disabled, for example, because of congestion or physical switch connection 608 failure.

Each switch can maintain a pre-established, alternate (internal to the switch) route for each micro-flow so that if a failure occurs externally, the switch can route the packets away from the problem area in a very short amount of time. Alternatively, a pre-established alternate route is maintained only for particular micro-flows on a configuration basis, since certain micro-flows may not carry important traffic and alternate route maintenance is expensive. Extensions to routing protocols provide the switches with the information ahead of time to ensure that diverse routes are chosen as the alternate routes. When such failures occur, the downstream switches operate as in the case of a first micro-flow packet, establishing micro-flows across the micro-flow LSP domain. In the event that the alternate internal route also is impacted by failure, new paths are chosen based upon utilization information that has been gathered about the available/in-service LSPs.

The switch, e.g., core label switch 604c, that re-directs the micro-flows, attaches a QoS header onto the first packet of the micro-flow to ensure that the QoS guarantees are maintained across the new LSP. Otherwise, the new switches in the route, downstream from the failure, cannot guarantee that they conform to the QoS that is achieved in the first portion of the micro-flow, upstream from the failure, towards the originator, from the congestion point.

For example, when core label switch 604c detects a failure in the connection 608 between label switch 604c and egress label switch 606a, the core label switch 604c reroutes the micro-flows of LSP#3 614 to travel along a pre-established alternate route. In this case the pre-established alternate route travels from core label switch 604c to core label switch 604a, and finally, to egress label switch 606a.

Because of the ability to automatically reroute micro-flows at the point of failure, rather than at the source, the fault recovery for embodiments of the present invention generally is within about 10 ms. In other words, an embodiment of the present invention allows rerouting at the same rate as the capacity of the LSP.

As stated previously, thresholds are set for each LSP to avoid over utilization of the LSP. For example, a threshold for LSP#1 610 may be set at 20% of the possible bandwidth for the LSP, thus leaving 80% of the bandwidth available for general use. The threshold helps ensure available bandwidth in the event of unexpected bursty traffic, or when rerouting must occur, as described in greater detail subsequently.

GR and MR traffic typically receives preference in the LSP. Therefore, based upon the above example, if 20% of the traffic through LSP#1 610 is GR and MR traffic, only 60% of the bandwidth will be left for AR traffic, since only 80% of the bandwidth was originally available for general use. The available bandwidth remaining after GR and MR traffic utilization, therefore, is shared by the AR traffic based on the assigned weight.

Advantageously, the threshold for each switch is set such that it can maintain the same QoS in the event of a traffic reroute, as described above. Thus, an embodiment of the present invention is configured such that there initially is spare bandwidth available to handle an increase in traffic due to traffic rerouting from another switch. This allows enhanced fault recovery.

Generally, a maintained state for each micro-flow allows LSP fault recovery within about 10 ms. Since conventional MPLS protocols have no notion of the individual micro-flows within a LSP, to reroute the LSP there must be a single LSP that can accommodate the entire contents of the rerouted LSP.

In contrast, an embodiment of the present invention allows the individual micro-flows within a single disabled LSP to be rerouted across multiple compatible LSPs. This flexibility in routing is a result of the present invention's ability to route individual micro-flows in addition to LSPs. Thus, through the use of load balancing at the point of failure, or at the beginning of the network, further network problems may be avoided. Moreover, reserved LSP thresholds may be much smaller since it is easier to incorporate a micro-flow into an existing path than it is to incorporate a large aggregate flow into the existing path.

Figure 7:
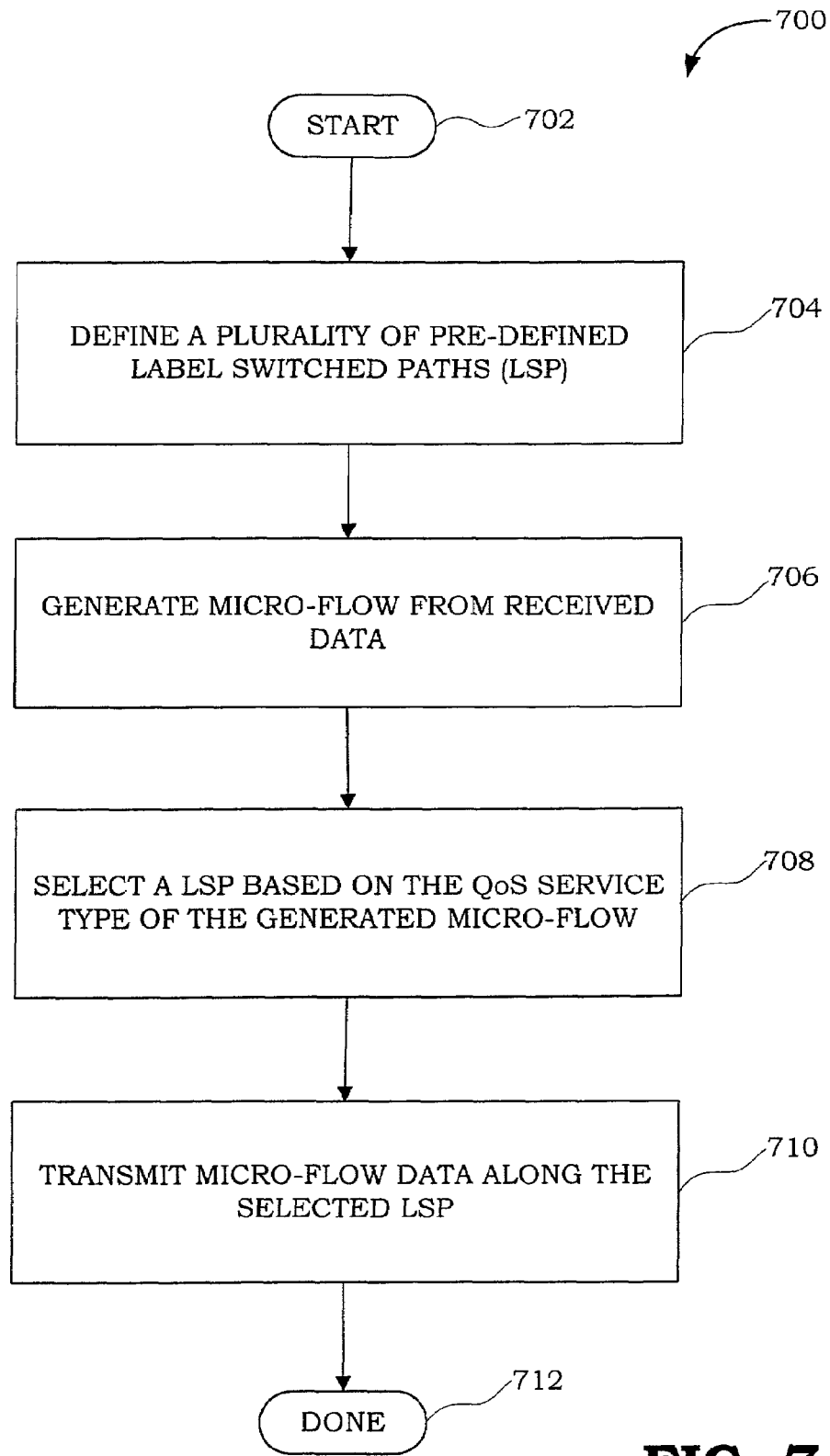
FIG. 7 is a flowchart showing a method for transmitting a micro-flow utilizing a micro-flow LSP network domain, in accordance with an embodiment of the present invention.

FIG. 7 is a flowchart showing a method 700 for transmitting a micro-flow utilizing a micro-flow LSP network domain, in accordance with an embodiment of the present invention. In an initial operation 702, pre-process operations can be performed. Pre-process operations can include connecting the micro-flow LSP network domain to a pre-existing network, and other pre-process operations that will be apparent to those skilled in the art.

In a LSP defining operation 704, a plurality of LSPs can be defined. As previously stated, an LSP defines a series of network nodes within the micro-flow LSP network domain that can be used to transmit micro-flows in an accelerated manner, without having to access the network layer at each switch. These LSPs can be defined in any manner, including using bandwidth constraints, node usage constraints, and ingress or egress constraints. After the LSPs are defined, each ingress label switch of the micro-flow LSP network domain has access to one or more egress label switches via one or more LSPs. Preferably, multiple LSPs are defined between each ingress switch and each egress switch to provide redundancy for load balancing, congestion avoidance, and link failure rerouting. After the LSPs are defined, the micro-flow LSP network domain is prepared to receive flow data at the various ingress switches of the network domain.

In a micro-flow generation operation 706, micro-flows are generated from flow data received at the ingress switch of the network domain. In particular, each packet of the received flow data is analyzed and provided with a label for transit across the micro-flow LSP network domain. Preferably, the first data packet also is given Quality of service (QoS) information that provides minimum quality of service constraints for that micro-flow. Quality of service can be predetermined or determined at the time of arrival of the first data packet of the data-flow. Additional FEC information provides further constraints on LSP selection. Admission control is then performed after selecting the set of LSP candidates to ensure the switch has sufficient resources to satisfy the FEC requirements.

Next, a LSP is selected based on the QoS information associated with the generated micro-flow, in a LSP selection operation 708. In use, each LSP has resource management information associated with the LSP for each micro-flow, provided by the RME packet. This information is used to determine which LSPs are capable of providing the QoS required by the micro-flow. Further, additional FEC information associated with the generated micro-flow may further constrain the selection of an LSP. Finally, among the LSPs satisfying the above requirements, load balancing is used to select the LSP with the least resource utilization.

The micro-flow then is transmitted along the selected LSP, in a micro-flow transmission operation 710. Once an appropriate LSP is selected, each packet of the micro-flow is transmitted along the same LSP to an egress label switch, where the label and QoS information is removed, and typically, the packets are forwarded to a conventional network using routing information. It should be noted that the entire path of a data flow may be within the micro-flow LSP network domain if both the source and target are within the scope of the network.

Post-process operations can be performed in operation 712. Post process operations can include forwarding the packet along a conventional network to the final destination of the flow data, and other post-process operations that will be apparent to those skilled in the art. Advantageously, an embodiment's ability of managing individual micro-flows allows an embodiment of the present invention to provide fast fault recover, and low congestion due to load balancing of the LSPs.

Figure 8:
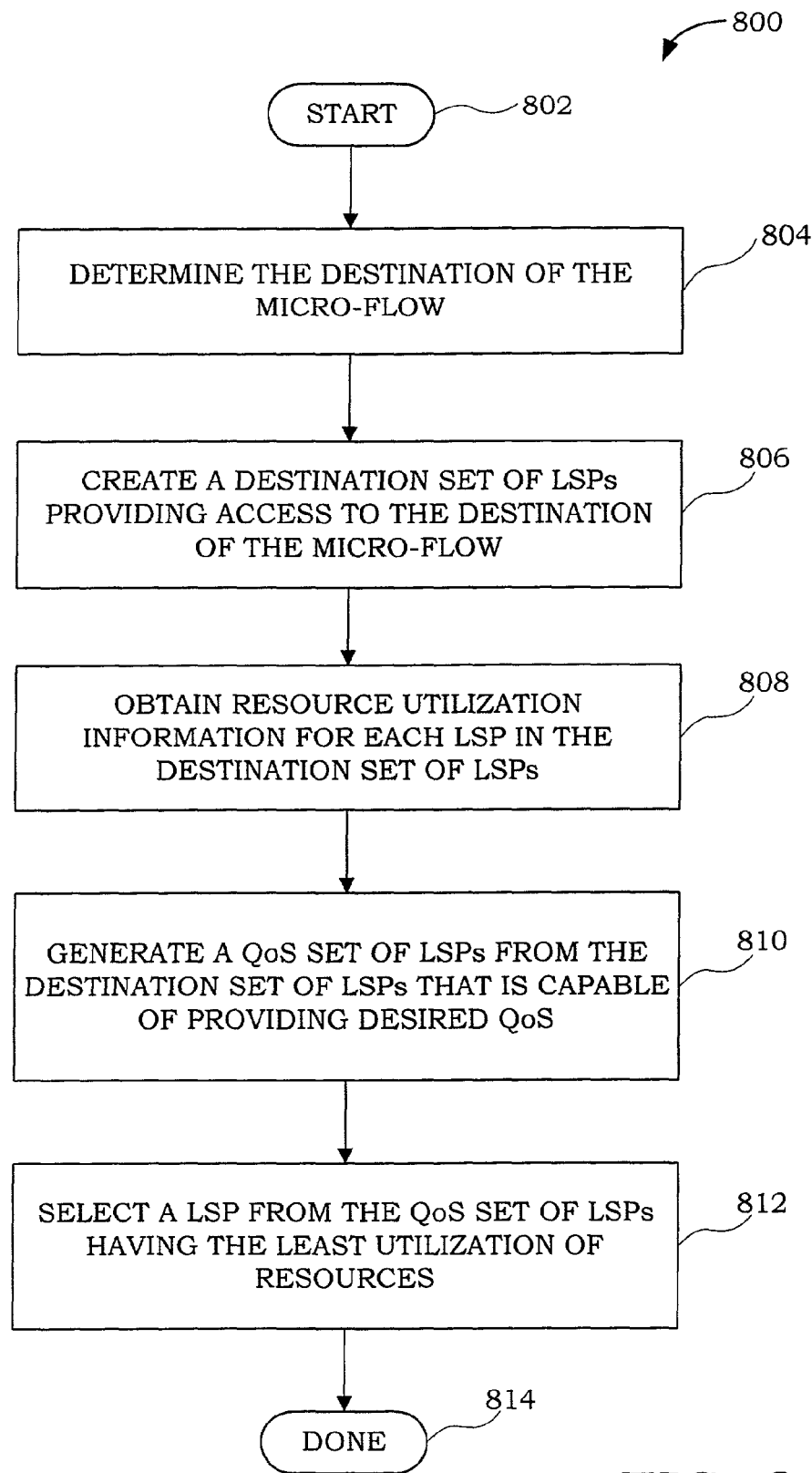
FIG. 8 is a flowchart showing a method for selecting a predefined LSP for transmission of a micro-flow, in accordance with an embodiment of the present invention.

FIG. 8 is a flowchart showing a method 800 for selecting a predefined LSP for transmission of a micro-flow, in accordance with an embodiment of the present invention. In an initial operation 802, pre-process operations can be performed, including generating a micro-flow from a received data flow at an ingress switch of the micro-flow LSP network domain, and other pre-process operations that will be apparent to those skilled in the art.

In a destination determination operation 804, the destination of the micro-flow is determined. As discussed previously, the ingress label switch parses each arriving packet to extract the network layer, such as a protocol type and source and destination addresses, and transport layer information that is used to select an LSP to use for transport across the micro-flow LSP network domain. This information then is used to create a micro-flow label that uniquely identifies the micro-flow.

If the data packet is part of an existing micro-flow, the ingress label switch uses the information related to that micro-flow to route the packet through the network. Otherwise, the ingress switch creates a new micro-flow by populating a label.

In a destination set operation 806, a destination set of LSPs is created that provides access to the destination of the micro-flow. The micro-flow LSP network domain of an embodiment of the present invention typically provides access to a plurality of egress switches, each of which provides access to a variety of destination addresses. Preferably, before further examination of LSPs is performed, the destination set of LSPs is determined wherein each LSP in the destination set can be used to provide access to the needed destination of the micro-flow. It should be noted that this operation may be performed later in the process 800, or optionally, omitted from the process 800. For example, operation 806 may be omitted when all the egress switches provide efficient access to the required destination address.

Resource utilization information then is obtained for the LSPs in the destination set, in a resource utilization operation 808. Generally, resource utilization information is provided via RMU and RME packets. RMU packets provide resource utilization within a single switch, while RME packets provide resource utilization information for an entire LSP. In this manner, embodiments of the present invention can use the resource information to manage micro-flows across the network domain in an intelligent fashion.

Next, in a QoS set generation operation 810, a QoS set of LSPs is generated that are capable of providing the needed QoS of the micro-flow. From the destination set of LSPs, the ingress switch determines which LSPs are capable of supporting the QoS required by the micro-flow. To determine the QoS capable of being supported by each LSP, the ingress label switch examines the resource utilization information obtained in operation 808. By removing LSPs not capable of currently supporting the required QoS from further consideration, an embodiment of the present invention can ensure a particular level of QoS is provided throughout the network domain for each micro-flow. The ingress switch selects the least utilized LSP for transmission of the micro-flow across the network domain, and Admission control is performed on the selected LSP to ensure the LSR has sufficient resources to satisfy the QoS requirements, as described in greater detail next with reference to operation 812.

A LSP having the least utilization of resources then is selected from the QoS set of LSPs, in a LSP selection operation 812. Having reduced the available LSPs to a set of LSPs that both provide access to the destination of the micro-flow and are capable of providing the QoS required by the micro-flow, the ingress switch selects the least utilized LSP for transmission of the micro-flow across the network domain. Thus, embodiments of the present invention load balance the network, resulting in more even LSP utilization and reduced congestion from LSP over-utilization. Since the bandwidth of the LSPs in the micro-flow LSP network domain is used at an even rate across all LSPs, the risk of congestion is greatly reduced. Moreover, the size of each aggregate flow through each LSP increases at a much slower rate than in conventional LSP based networks.

Post process operations then are performed in operation 814. Post process operations include transmitting the micro-flow along the selected LSP, and other post process operations that will be apparent to those skilled in the art.

Figure 9:
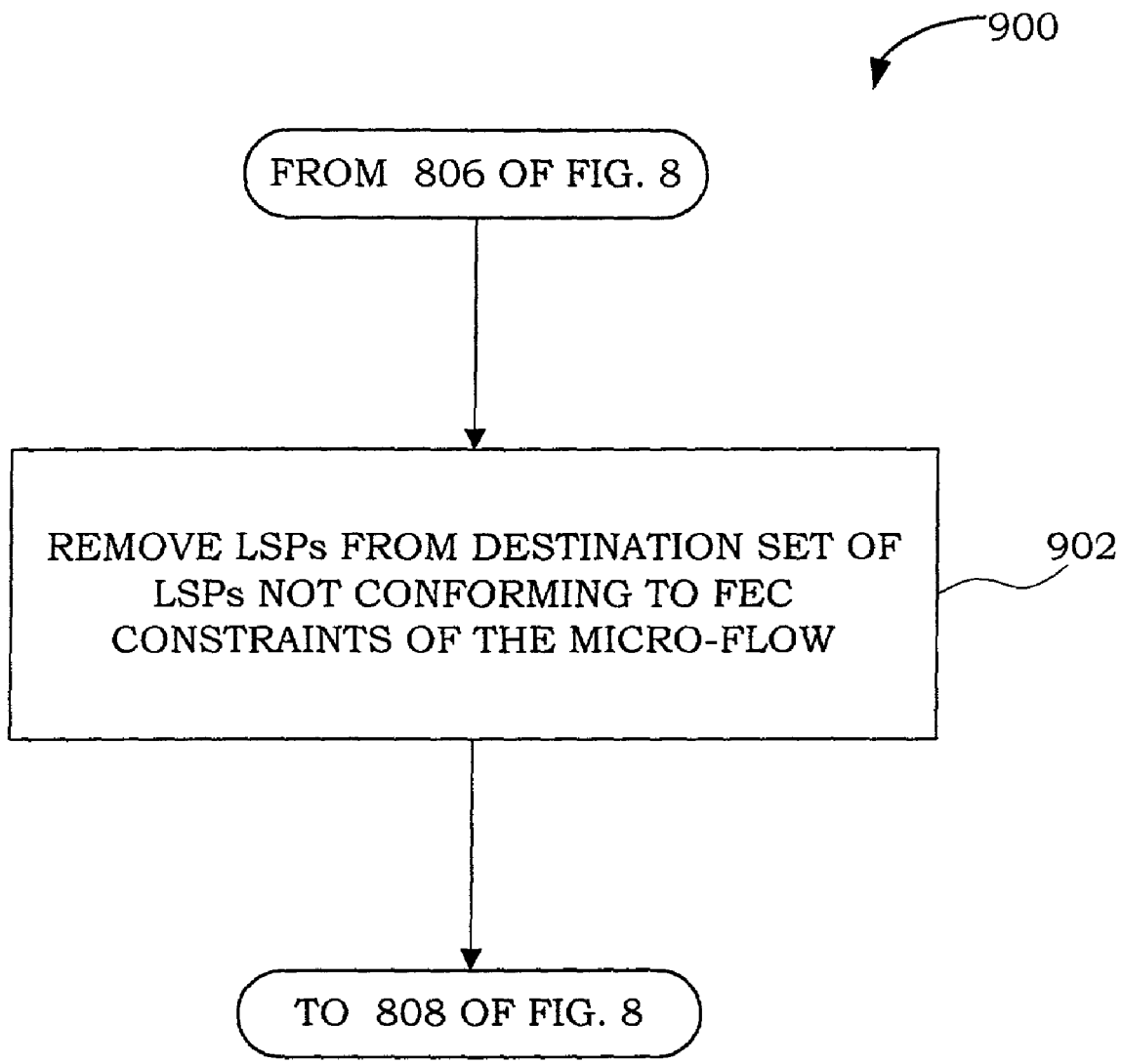
FIG. 9 is a flowchart showing an alternate embodiment method for selecting a predefined LSP for transmission of a micro-flow having an associated FEC, in accordance with an embodiment of the present invention.

FIG. 9 is a flowchart showing a method 900 for selecting a predefined LSP for transmission of a micro-flow having an associated FEC, in accordance with an alternate embodiment of the present invention. As stated previously, micro-flows of the present invention may have additional FECs associated with them. The FEC of a micro-flow provides further LSP constraints for transmission of the micro-flow. Method 900 provides an additional operation for transmitting micro-flows having additional FECs.

After creation of the destination set in operation 806 of method 800, the additional FEC requirements of the micro-flow is considered, in a FEC operation 902. The additional FEC requirements of the micro-flow is analyzed for additional LSP constraints. Then, LSPs of the destination set that do not conform to the FEC constraints of the micro-flow are removed from the destination set. For example, a micro-flow may have additional FEC requirements that require the micro-flow to be sent along a particular set of predefined LSPs. LSPs of the destination set that are not also within the FEC's set of predefined LSPs then are removed from the destination set. Thereafter, resource utilization information is obtained in the resource utilization operation 808.

Although the foregoing invention has been described in some detail for purposes of clarity of understanding, it will be apparent that certain changes and modifications may be practiced within the scope of the claims. Accordingly, the present embodiments are to be considered as illustrative and not restrictive, and the invention is not to be limited to the details given herein, but may be modified within the scope and equivalents of the claims.

What is claimed is:

1. A method for providing an aggregate micro-flow, comprising the operations of:
defining a set of label switched paths;
defining a micro-flow comprising a set of data packets, the micro-flow having a quality of service type;

selecting a particular label switched path from the defined set of label switched paths based on the quality of service type of the micro-flow; and transmitting the micro-flow along the selected label switched path; the micro-flow having an associated forwarding equivalence class, the forwarding equivalence class defining additional transmission constraints for the micro-flow.

2. A method as recited in claim 1, further comprising the operation of determining a quality of service type supportable by label switched paths of the defined set of label switched paths.

3. A method as recited in claim 2, wherein the selected label switched path is in a set of label switched paths capable of supporting the quality of service type of the micro-flow.

4. A method as recited in claim 3, wherein the selected label switched path is utilized by fewer data packets than other label switched paths within the set of label switched paths capable of supporting the quality of service type of the micro-flow.

5. A method as recited in claim 1, further comprising the operation of determining a destination set of defined label switched paths capable of providing access to a destination address of the micro-flow.

6. A method as recited in claim 5, further comprising the operation of determining a quality of service type supportable by label switched paths of the destination set of label switched paths.

7. A method as recited in claim 6, wherein the selected label switched path is in a quality of service set of label switched paths capable of supporting the quality of service type of the micro-flow.

8. A method as recited in claim 7, wherein the selected label switched path is utilized by fewer data packets than other label switched paths within the quality of service set of label switched paths.

9. A method as recited in claim 1, wherein the quality of service of the micro-flow includes transmission rate information.

10. A method as recited in claim 1, wherein the quality of service of the micro-flow includes delay variation information.

11. A micro-flow wrapper logical unit, comprising:
a predefined label switched path, the label switched path adapted to define a physical path along a set of network switches for transmission of a network data packet, the label switched path capable of supporting a first quality of service type for data packets transmitted along the label switched path; and
a micro-flow comprising a plurality of data packets transmitted along the predefined label switched path, the micro-flow having a second quality of service type, wherein the first quality of service type is not a lower quality of service than the second quality of service type; and
wherein the micro-flow has an associated forwarding equivalence class, the forwarding equivalence class defining additional transmission constraints for the micro-flow.

12. A micro-flow wrapper logical unit as recited in claim 11, wherein the micro-flow includes a label that identifies the micro-flow.

13. A micro-flow wrapper logical unit as recited in claim 11, wherein the first and second quality of service type is selected from the set consisting of Available Rate Traffic, Maximum Rate Traffic, and Guaranteed Rate Traffic.

14. A micro-flow wrapper logical unit as recited in claim 11, wherein the predefined label switched path is in a set of predefined label switched paths for a network.

15. A micro-flow wrapper logical unit as recited in claim 14, wherein the predefined label switched path is utilized by fewer data packets than other label switched paths in the set of predefined label switched paths.

16. A network switch for routing a micro-flow, comprising:
a database including a predefined a set of label switched paths;
an internal routing fabric capable of internally routing a micro-flow, wherein the micro-flow comprises a set of data packets, and wherein the micro-flow has a quality of service type;
logic that selects a particular label switched path from the defined set of label switched paths included in the database, the particular label switched path being selected based on the quality of service type of the micro-flow; and
an egress line card capable of transmitting the micro-flow along the selected label switched path; and
wherein the micro-flow has an associated forwarding equivalence class, the forwarding equivalence class defining additional transmission constraints for the micro-flow.

17. A network switch as recited in claim 16, further comprising logic for determining a quality of service type supportable by label switched paths of the defined set of label switched paths.

18. A network switch as recited in claim 17, wherein selected label switched path is in a set of label switched paths capable of supporting the quality of service type of the micro-flow.

19. A network switch as recited in claim 18, wherein the selected label switched path is utilized by fewer data packets than other label switched paths within the set of label switched paths capable of supporting the quality of service type of the micro-flow.

20. A network switch as recited in claim 16, further comprising logic that determines a destination set of defined label switched paths capable of providing access to a destination address of the micro-flow.

21. A network switch as recited in claim 20, further comprising the operation of determining a quality of service type supportable by label switched paths of the destination set of label switched paths.

22. A network switch as recited in claim 21, wherein the selected label switched path is in a quality of service set of label switched paths capable of supporting the quality of service type of the micro-flow.

23. A network switch as recited in claim 22, wherein the selected label switched path is utilized by fewer data packets than other label switched paths within the quality of service set of label switched paths.

24. A network switch as recited in claim 16, wherein the selected label switched path is in a set of label switched paths conforming to the transmission constraints of the forwarding equivalence class.

25. A method for transmitting a data flow over a network connection, comprising the operations of:
receiving a first aggregate flow comprising a plurality of individual data flows at an ingress line card, each individual data flow comprising a plurality of data packets;

separating the first aggregate flow into a plurality of individual micro-flows at the ingress line card, each individual micro-flow comprising a data flow;

routing the micro-flows to an egress line card, the egress line card being selected based on a quality of service of each individual micro-flow;

assembling the plurality of individual micro-flows into a second aggregate flow having a quality of service capable of supporting the quality of service of the plurality of micro-flows, the assembling being performed at the egress line card; and transmitting the second aggregate flow over the network connection.

26. A method for transmitting a data flow over a network connection as recited in claim 25, wherein the first aggregate flow is a label switched path and the second aggregate flow is another label switched path.

27. A method for transmitting a data flow over a network connection as recited in claim 26, further comprising the operation of determining a destination set of label switched paths capable of providing access to a destination address of the micro-flow.

28. A method for efficiently transmitting an aggregate micro-flow over a selected label switch path based on active analysis of quality of service parameters for a set of label switched paths, each label switched path having a dynamically changing quality of service, the method comprising:

(a) receiving a data-flow including a set of data packets;

(b) forming a micro-flow from the data-flow, the micro-flow having a quality of service type that includes transmission rate information;

(c) at a particular time, determining the quality of service supportable each of the label switched paths;

(d) selecting a particular label switched path from the defined set of label switched paths based on the quality of service type of the micro-flow, wherein the quality of service supportable by the particular label switched path is not less than quality of service type of the micro-flow;

(e) transmitting the micro-flow along the selected label switched path; and (f) repeating (a)–(e) for any additional received data-flows.

29. A method for transmitting a received multiple label switched path-based an aggregate micro-flow over a selected label switch path based on active analysis of quality of service parameters for a set of label switched paths, each label switched path having a dynamically changing quality of service, the method comprising:

(a) receiving a data-flow including a set of data packets;

(b) forming a micro-flow from the data-flow, the micro-flow having a quality of service type that includes transmission rate information;

(c) at a particular time, determining the quality of service supportable each of the label switched paths;

(d) selecting a particular label switched path from the defined set of label switched paths based on the quality of service type of the micro-flow, wherein the quality of service supportable by the particular label switched path is not less than quality of service type of the micro-flow;

(e) transmitting the micro-flow along the selected label switched path; and (f) repeating (a)–(e) for any additional received data-flows.

* * * * *

Disclaimer

7,012,919 B1 - Tricci Y. So, San Carlos, CA (US); Lawrence G. Roberts, Woodside, CA (US); Faizel Z. Lakhani, Campbell, CA (US); John A. McBrayne, Mountain View, CA (US); Gary G. Croke, Palo Alto, CA (US). MICRO-FLOW LABEL SWITCHING. Patent dated March 14, 2006. Disclaimer filed September 2, 2021, by the assignee, Sable Networks, Inc.

I hereby disclaim the following complete claims 1-24 and 28-29 of said patent.

*(Official Gazette, September 6, 2022)*